United States Patent
Schermanz et al.

(10) Patent No.: US 8,465,713 B2
(45) Date of Patent: Jun. 18, 2013

(54) CATALYST COMPOSITION FOR SELECTIVE CATALYTIC REDUCTION OF EXHAUST GASES

(75) Inventors: Karl Schermanz, Launsdorf (AT); Amod Sagar, Althofen (AT); Alessandro Trovarelli, Pagnacco (IT); Marzia Casanova, Ravascletto (IT)

(73) Assignee: Treibacher Industrie AG, Treibach-Althofen (AT)

( * ) Notice: Subject to any disclaimer, the term of this patent is extended or adjusted under 35 U.S.C. 154(b) by 0 days.

(21) Appl. No.: 13/002,900

(22) PCT Filed: Apr. 16, 2010

(86) PCT No.: PCT/AT2010/000116
§ 371 (c)(1),
(2), (4) Date: Feb. 11, 2011

(87) PCT Pub. No.: WO2010/121280
PCT Pub. Date: Oct. 28, 2010

(65) Prior Publication Data
US 2011/0150731 A1   Jun. 23, 2011

(30) Foreign Application Priority Data
Apr. 23, 2009  (AT) .................................. A 626/2009

(51) Int. Cl.
*B01J 23/00* (2006.01)
*B01J 21/00* (2006.01)
*B01J 20/00* (2006.01)

(52) U.S. Cl.
USPC ........ 423/239.1; 502/242; 502/304; 502/309; 502/312; 502/314; 502/316; 502/324; 502/326; 502/338; 502/350; 502/353; 502/406

(58) Field of Classification Search
USPC .................. 502/242, 302, 309, 312, 314, 316, 502/324, 326, 338, 350, 353, 406; 423/239.1
See application file for complete search history.

(56) References Cited

U.S. PATENT DOCUMENTS

| | | | |
|---|---|---|---|
| 3,830,755 A * | 8/1974 | Reuter et al. .................. | 502/242 |
| 4,085,193 A | 4/1978 | Nakajima et al. | |
| 4,221,768 A | 9/1980 | Inoue et al. | |
| 4,259,211 A * | 3/1981 | Krabetz et al. ................ | 502/178 |
| 4,351,811 A * | 9/1982 | Matsuda et al. ........... | 423/239.1 |

(Continued)

FOREIGN PATENT DOCUMENTS

| | | |
|---|---|---|
| EP | 0 212 515 | 3/1987 |
| EP | 0 787 521 A1 | 8/1997 |

(Continued)

OTHER PUBLICATIONS

M. Rice, et al., Development of an Integrated NOx and PM Reduction Aftertreatment System: SCRi for Advanced Diesel Engines, SAE technical paper 2008-01-132, SAE World Congress Detroit, Michigan Apr. 14-17, 2008.

(Continued)

*Primary Examiner* — Cam N. Nguyen
(74) *Attorney, Agent, or Firm* — Workman Nydegger

(57) ABSTRACT

A catalyst composition represented by the general formula $XVO_4/S$ wherein $XVO_4$ stands for TransitionMetal-Vanadate, or a mixed TransitionMetal-/RareEarth-Vanadate, and S is a support comprising $TiO_2$.

18 Claims, 5 Drawing Sheets

U.S. PATENT DOCUMENTS

| | | | |
|---|---|---|---|
| 4,466,947 A | | 8/1984 | Imanari et al. |
| 4,518,710 A | * | 5/1985 | Brennan ............... 502/309 |
| 4,582,912 A | * | 4/1986 | Saleh et al. ............ 549/239 |
| 4,916,107 A | * | 4/1990 | Brand et al. ........... 502/309 |
| 4,925,825 A | * | 5/1990 | Tachi et al. ............ 502/309 |
| 5,292,704 A | * | 3/1994 | Lester .................... 502/309 |
| 5,753,582 A | * | 5/1998 | Garcin et al. .......... 502/323 |
| 6,054,408 A | * | 4/2000 | Hums et al. ............ 502/217 |
| 6,805,849 B1 | | 10/2004 | Andreasson et al. |
| 7,138,358 B2 | * | 11/2006 | Huang et al. .......... 502/326 |
| 7,674,745 B2 | * | 3/2010 | Heidemann et al. ... 502/330 |
| 7,960,307 B2 | * | 6/2011 | Gao et al. .............. 502/247 |
| 2008/0234126 A1 | | 9/2008 | Hong et al. |

FOREIGN PATENT DOCUMENTS

| | | |
|---|---|---|
| EP | 1 145 762 | 10/2001 |
| GB | 1 430 730 | 4/1976 |
| GB | 1 495 396 | 12/1977 |
| GB | 2 149 680 | 6/1985 |
| WO | 2005/046864 | 5/2005 |

OTHER PUBLICATIONS

M. T. Jan, et al "Reduction of Nitrogen Oxides by Ammonia Over Iron-Containing Catalysts" Chemical Engineering & Technology,vol. 30, Issue 10, Oct. 2007, pp. 1440-1444.

James. W. Girard et al., "Technical Advantages of Vanadium SCR Systems for Diesel NOx Control in Emerging Markets", SAE technical paper 2008-01-132, SAE World Congress Detroit, Michigan Apr. 14-17, 2008.

J. Münch et al "Extruded Zeolite based Honeycomb Catalyst for NOx Removal from Diesel Exhaust", SAE Paper 2008-01-1024.

* cited by examiner

CATALYST COMPOSITION FOR SELECTIVE CATALYTIC REDUCTION OF EXHAUST GASES

BACKGROUND OF THE INVENTION

1. Field of Invention

The present invention relates to a catalyst composition for selective catalytic reduction of exhaust gases and a process for its preparation. More specifically, such a catalyst composition may be used in catalyst application for the removal of $NO_x$, especially in exhaust gas after treatment of diesel- and lean burn engines of automotive. In addition the catalyst composition may also be used in stationary applications (e.g. removal of NO in power plant stations).

2. Related Technology

The most widely employed technology for removal of $NO_x$ out of exhaust gases is S(elective) C(atalytic) R(eduction), e.g. O. Kröcher, Chapter 9 in <<Past and Present in DeNOx Catalysis>>, edited by P. Granger et al., published by Elsevier 2007. Accordingly, $NO_x$ is removed by Ammonia into Nitrogen and water according to the reaction:

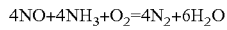

$$4NO+4NH_3+O_2=4N_2+6H_2O$$

For the stationary application mainly $V_2O_5$ doped $TiO_2/WO_3$ compositions are used commercially since 1970 to remove nitrogen oxide emissions of fossil fuel power plants.

Already 15 years ago, the idea was discussed to apply SCR also on mobile diesel engines, which is now an emerging technology for the NOx reduction from heavy duty diesel vehicles, passenger cars and off road machines.

A typical SCR system consists of a reduction catalyst, urea injection and dosing components, pipes and a storage tank. A huge number of modern catalysts are extruded substrates or coated substrates with Vanadium Pentaoxide ($V_2O_5$) as the catalytically active component.

Catalytic coatings of zeolite based SCR are currently being developed because of the limited temperature stability of the vanadium catalysts and the fact that Vanadium Pentaoxide ($V_2O_5$) has been classified as a health risk in some countries. Increased temperature stability is especially important in SCR catalysts installed downstream a particulate filter since relatively high temperatures are generated during filter regeneration (M. Rice, R. Mueller at al., Development of an Integrated NOx and PM Reduction Aftertreatment System: SCRi for Advanced Diesel Engines, SAE technical paper 2008-01-132, SAE World Congress Detroit, Mich. Apr. 14-17, 2008)

There are further reports on the commercially applied well known $V_2O_5/WO_3$—$TiO_2$ material for exhaust gas aftertreatment of automotives by O. Kröcher in Chapter 9, p. 267f in <<Past and Present in DeNOx Catalysis>>, edited by P. Granger et al.

According to the presentation given by Dirk Vatareck (Catalysts Automotive Applications, Argillon) at the $3^{rd}$ CTI Forum SCR Systems (Bonn 9 Apr. 2008) Titania-tungsten oxide based catalysts containing $V_2O_5$ as active component are applied for making automotive catalysts in a huge number (approx. 4 Mio. Catalysts/year).

The preparation of $V_2O_5$ containing materials based on $TiO_2/WO_3$ which additionally may contain oxides out of transition metals, Rare Earths and other elements and the application in SCR is widely disclosed in numerous publications, patent applications and patents. For example GB 1 495 396 describes a catalyst composition containing as active ingredients oxides from titanium, at least one of molybdenum, tungsten, iron, vanadium, nickel, cobalt, copper, chromium and uranium, and as optional component(s) tin and/or at least one of silver, beryllium, magnesium, zinc, boron, aluminium, yttrium, rare earth metal, silicon, niobium, antimony, bismuth, manganese, thorium and zirconium, which oxides are present as an intimate mixture.

EP 787 521 describes the preparation of several V-containing catalysts based on $TiO_2/WO_3$ containing additional dopants such as $Y_2O_3$, $B_2O_3$, PbO, $SnO_2$ the vanadium being present as Vanadiumpentaoxide $V_2O_5$.

U.S. Pat. No. 4,221,768 reports on $V_2O_5$ containing materials based on $TiO_2$ as a support material and additional oxides out of transition metals as dopants. Additional SCR-Materials which contains $V_2O_5$ supported on $TiO_2$ are also described in GB 1 430 730.

$V_2O_5$ containing materials which contain $TiO_2$, $SiO_2$, S and Oxides of Ce, Sn, Mo and W are reported in UK Appl. GB 2 149 680.

U.S. Pat. No. 4,466,947 describes V-containing denitration catalysts in which the vanadium is present in form of an oxide or a sulfate.

EP 1 145 762 A1 describes a process for the preparation of a vanadia SCR-catalyst supported on titania.

The main disadvantage of the V-based catalyst type is the limited stability at temperatures above 600° C.

A report on the stability of a SCR system based on $TiO_2/WO_3/V_2O_5$ is given by Jan M T et al. in Chemical Engineering & Technology, Vol. 30, No 10, 1440-1444, 2007. Accordingly a deactivation of the catalyst occurs since $V_2O_5$ melts at approx. 650° C.

A $TiO_2/WO_3/V_2O_5$ suitable SCR catalyst for $NO_x$ removal of Diesel-powered vehicles is described in U.S. Pat. No. 6,805,849 B1, column 2. Although such a catalyst has shown good performance it was found that sustained high temperature operation can cause catalyst deactivation. Heavy duty diesel engines, which are almost exclusively charged, can produce exhaust gases at greater than 500° C. Under conditions of high load and/or high speed, and such temperatures deactivation of the catalyst may occur.

In the presentation of Dirk Vatareck (Catalysts Automotive Applications, Argillon) at the $3^{rd}$ CTI Forum SCR Systems (Bonn 9 Apr. 2008) there were reported maximum operation temperatures for a $TiO_2/WO_3/V_2O_5$ catalyst of 550° C. and 580° C. for short term basis.

In view of the application under EURO 6 an improvement in thermal stability of a $V_2O_5$ containing $TiO_2/WO_3$ based catalyst was reported in the presentation of Dirk Vatareck (Catalysts Automotive Applications, Argillon) at the $3^{rd}$ CTI Forum SCR Systems (Bonn 9 Apr. 2008). Accordingly a catalyst containing $V_2O_5$ as active component and a support material consisting of $TiO_2/WO_3$ and additionally containing Si may be operated at max. temp. of 600° C. and 650° on a short term basis.

Vanadium based systems with improved thermal stability are also reported by James. W. Girard et al., "Technical Advantages of Vanadium SCR Systems for Diesel $NO_x$ Control in Emerging Markets", SAE technical paper 2008-01-132, SAE World Congress Detroit, Mich. Apr. 14-17, 2008. After ageing at 600° C./50 hrs the catalyst is still active. However, because of high exhaust gas temperatures possible during active Diesel Particulate Filter (DPF) regeneration, vanadium SCR catalysts are usually not considered for these applications.

With increasingly stringent automobile exhaust emission regulations for Diesel vehicles (US 2010 and EURO 6 regulations) aftertreatment systems containing a Diesel Particulate Filter (DPF) as well as a SCR catalyst will be required in future. Such systems will demand a higher temperature stability of the SCR catalyst and $V_2O_5$ based systems are not considered to be viable for such an application as additionally to the problem of heat stability $V_2O_5$ may be exhausted also to the environment (J. Munch et al "Extruded Zeolite based Honeycomb Catalyst for $NO_x$ Removal from Diesel Exhaust, SAE Paper 2008-01-1024). Since the activity of SCR catalysts in the temperature range of 180-350° C. is important in the diesel application there have been established systems to improve catalytic activity in the low temperature range.

For example with the aid of a diesel oxidation catalyst (DOC) attached in front of the SCR system (NO being present as a majority (=more than 90%) in the raw emission of the diesel engine) is oxidized to form $NO_2$. The $NO_2$ can be used to burn up particulates and to improve the low temperature activity (in the range 180-350° C.), see M. Rice, R. Mueller at al., Development of an Integrated $NO_x$ and PM Reduction Aftertreatment System: SCRi for Advanced Diesel Engines, SAE technical paper 2008-01-132, SAE World Congress Detroit, Mich. Apr. 14-17, 2008.

In the same publication there are summarized the design parameters of two engine/aftertreatment scenarios for US 2010/Euro 6. One concept will lead to high particulate matters/low $NO_x$ with active regeneration of the PM-filter. The SCR catalyst proposed for the described scenario is a zeolite. Zeolites must be used since higher heat resistance of the SCR system is required due to the active regeneration of the PM filter.

The second concept comprises an engine concept which will lead to low concentrations of PM and low $NO_x$ concentrations. The SCR catalyst may consist of a vanadium based material or a zeolite. Both concepts will use a diesel oxidation catalyst (DOC) prior to the SCR treatment. The problem of low temperature activity of SCR catalysts is also addressed in US 2008/0234126 A1. It is described a method for the preparation of a vanadium/titania based catalyst with enhanced low temperature activity for removing nitrogen oxides at a window of 300° C. and lower. However, US 2008/0234126 A1 does not address the problem of stability of the catalyst >600° C.

An improvement in terms of the thermal stability of a V-containing $TiO_2/WO_3/SiO_2$ "SCR catalyst" is reported in the WO 2005/046864 A1. According to a preferred embodiment the vanadium in the formulations based on $TiO_2/WO_3/(SiO_2)$ is present not in form of Vanadiumpentaoxide ($V_2O_5$) but in form of a Rare Earth Vanadate ($REVO_4$). The Rare Earth vanadate may be introduced to the support material ($TiO_2/WO_3/(SiO_2)$) as a powder by simple mixing route (of the support and the Rare Earth Vanadate) following by calcination of the mixture.

Alternatively the Rare Earth Vanadates may be formed in the composition also in situ during the preparation (calcination) of the catalyst composition from precursors eg. Rare Earth acetate and Ammoniummetavanadate. The presence of the Rare Earth Vanadates in the catalyst is proved by XRD.

The catalyst compositions referred in WO 2005/046864 A1 exhibit good $NO_x$ conversion activity after being heat treated at 750° C./10 hrs, whereas in contrast the reference material containing $V_2O_5$ on the $TiO_2/WO_3/SiO_2$ support may be considered to be almost inactive after being heat treated (aged) at 750° C./10 hrs.

However, WO 2005/046864 A1 does not describe any $NO_x$ conversion rates below 250° C., eg at 230° C. and 200° C. which is important for the automotive SCR systems. As shown in comparative example 2 an $ErVO_4$ doped $TiO_2/WO_3/SiO_2$ composition, which refers to Example 18, Table 2b in WO 2005/046864 A1, was subjected to $NO_x$ conversion test at temperatures at 200° C. and 230° C. $NO_x$ conversion was found to be zero at 200° and 230° C. and 25% at 250° C. for the "fresh" material.

After heat treatment of the compound at 700° C./10 hrs there was found an increase of catalytic activity exhibiting a relatively low $NO_x$ conversion at 200° C. and 230° C. being 6% at and 20% respectively; at 250° C. there was measured a conversion rate of 55%.

Comparative example 1 refers to a commercially available catalyst containing $V_2O_5$ supported on $TiO_2/WO_3/SiO_2$ which is currently applied in heavy duty diesel SCR. After heat treatment at 650° C./2 hrs the material still exhibits activities. However the activity in the range 200-250° C. is already less than 50%; the activity drops significantly after heat treatment 700° C./10 hrs.

In addition in comparative example 1.1 it is shown, that a $TiO_2/WO_3/SiO_2$:$V_2O_5$ catalyst is almost inactive after being heat treated at 750° C./10 hrs.

As a summary out of the state of the art review it may be concluded that RE-Vanadate doped $TiO_2/WO_3/SiO_2$ materials are more heat stable compared to the V2O5 doped materials but show a weakness in $NO_x$ conversion at operating temperatures below 300° C. $V_2O_5$ containing $TiO_2/WO_3/SiO_2$ materials seem to be operable up to 650° C. but loose already activity.

BRIEF SUMMARY OF THE INVENTION

Keeping in mind the above problems occurring in the prior art the objective of the invention is to provide
a) V-based compositions with improved heat resistance up to 700° C. when compared to $V_2O_5$ containing state of the art materials
b) V-based compositions with improved heat resistance up to 800° C. and improved $NO_x$ activity below 300° C. when compared to RE-Vanadate state of the art materials.

The catalyst composition according to the invention is represented by the general formula $$XVO_4/S$$

wherein
$XVO_4$ stands for
(a) a TransitionMetal-Vanadate,
or
(b) a mixed TransitionMetal-/RareEarth-Vanadate,
and
S is a support comprising $TiO_2$.

For the purpose of the present specification and claims the term "RareEarth" means a RareEarth element or a mixture thereof, i.e. more than one RareEarth element. According to IUPAC the RareEarth elements are Sc, Y and the fifteen Lanthanides La, Ce, Pr, Nd, Pm, Sm, Eu, Gd, Tb, Dy, Ho, Er, Tm Yb and Lu.

For the purpose of the present specification and claims the term "TransitionMetal" means a TransitionMetal element or a mixture thereof, i.e. more than one TransitionMetal element. According to IUPAC a TransitionMetal is an element whose atom has an incomplete d sub-shell, or which can give rise to cations with an incomplete d sub-shell. However, for the purpose of the present specification and claims, the term TransitionMetal shall only comprise the elements of groups 4-11 on the periodic table and Zn.

The present invention is based on the surprising finding that the new compositions based on $TiO_2$ or $TiO_2/WO_3$ (TW) or $TiO_2/WO_3/SiO_2$ (TWS) have enhanced heat resistance and enhanced $NO_x$ conversion activity when compared to the state of the art materials. Preferred embodiments of these new catalyst compositions contain dopants based on Fe-Vanadate, mixed Fe-/RareEarth-Vanadates or mixed Fe-/RareEarth-/Transition-Metal Vanadates.

Hence, such compounds may be useful for exhaust gas aftertreatment of diesel and lean burn engines in combination with a particulate filter in future SCR systems.

The TransitionMetal is preferably selected out of the group consisting of Mn, Cu, Fe, Zn, Zr, Nb, Mo, Ta and W.

More preferably the TransitionMetal is selected one out of the group consisting of Fe, Mn, Cu and Zr.

Most preferred is Fe as the TransitionMetal.

A further preferred embodiment of the catalyst composition according to the invention is characterized in that said support contains $TiO_2$ in an amount of at least 55 wt.-%, $WO_3$ in an amount of 1-20 wt.-%, and optionally $SiO_2$ in an amount of up to 20 wt.-%, said catalyst composition containing $XVO_4$ in an amount between 0.2% by weight and 25% by weight.

Said RareEarth preferably is Er or one of Gd and Sm and Y.

Further preferred embodiments are characterized in that S contains $SiO_2$ in an amount of 4-15 wt.-%, particularly in an amount of 5-10 wt.-%.

The present invention is also directed to a process for the preparation of the catalyst composition comprising
a) suspending a support material containing $TiO_2$ and $XVO_4$ in water forming an intimate mixture comprising said support material and said $XVO_4$
b) evaporating the excess of water,
c) drying the mixture (preferably at a temperature between 80 and 150° C.), and
d) calcining the dried mixture under air at a temperature between 500 and 850° C.,
wherein
$XVO_4$ stands for TransitionMetal-Vanadate or a mixed TransitionMetal-/RareEarth-Vanadate.

A further preferred embodiment is characterized in that the Vanadate prior to the mixing to the support is pre-heattreated separately, preferably in the range of higher than 350° C. and below its melting point, which pre-heattreatment results in a significant increase of the catalytic activity of the catalysts.

For the preparation of the Fe-Vanadate, mixed Fe-/RareEarth-Vanadates and mixed Fe-/RareEarth-/Transition-Metal Vanadate dopants there was applied a wet chemical process which in principle is based on the method described in WO 2005/046864 and applies precipitation and co-precipitation method.

The compositions based on the support $TiO_2/WO_3$ (TW) and $TiO_2/WO_3/SiO_2$ (TWS) which are doped with Fe-Vanadate, mixed Fe-/RareEarth-Vanadates or mixed Fe-/RareEarth-/Transition-Metal Vanadates according to the invention are preferably produced by a process comprising
(a) suspending the support material TW, TWS and the Fe-Vanadate, mixed Fe-/RareEarth-Vanadates or mixed Fe-/RareEarth-/Transition-Metal Vanadate in water forming an intimate mixture between the support (TW, TWS) and the Vanadate, the Vanadate optionally being pre-heattreated >350° C. below its melting point prior to its mixing with the support
(b) evaporating the excess of water over several hours
(c) drying the mixture at approx. 120° C. for approx. 10-16 hrs
(d) calcining the mixture under air at 650° C./2 hrs, optionally (depending on the heat resistance of the compound) also at lower (eg 500° C.) or higher temperatures, eg in a range between 650° C. and 850° C. up to 120 hours
(e) optionally transforming the calcined powder into a shaped form
(f) optionally coating the calcined powder on a ceramic or metallic honeycomb.

A preferred embodiment of the inventive process for the preparation of a catalyst composition is characterized in that one of the TransitionMetals is at least one out of the group consisting of Mn, Cu, Fe, Zn, Zr, Nb, Mo, Ta and W, or at least one out of the group consisting of Fe, Mn, Cu and Zr.

The content of the dopant introduced to the support material is typically 8.4% by weight but may be applied in lower (0.2%) and higher concentrations (up to 25%) also.

The compositions prepared according to the invention were calculated on the content of Vanadium out of the amounts of support and dopant (both analytically well characterised) used for the preparation of the compositions.

The invention is also directed to a catalyst comprising a catalyst composition as described above and a binder which typically may comprise $Al_2O_3$ or Silica.

The compositions were characterised on specific surface area and partly in terms of XRD structure.

The specific surface area of the materials were measured by BET method using $N_2$ adsorption/desorption at 77 K employing a Micromeritics Tristar apparatus, after pre-treatment under vacuum at 150° C. for 1.5 hours.

XRD Measurements were made by using a Philips X'Pert diffractometer using a Ni-filtered Cu K$\alpha$ radiation at 40 KV and 40 mA.

For catalytic testing on $NO_x$ removal efficiency the compositions were subjected to catalytic testing.

There were applied two tests, test A (standard test on powder) and test B (test with real catalyst).

Conditions for Catalytic Testing:

A) Standard Catalytic Test (A)

Sample Preparation

Powders yielded by the process according to the invention were pressed into pellets, crushed and sieved in the range 355-425 μm.

Heat Treatment (Ageing)

For the measurement of the catalytic activity after heat treatment the sieved powders were subjected to calcination (ageing) in a static muffle furnace under air atmosphere at 700° C./10, 750° C./10 and partly at 800° C./10 hrs.

Measurement of Catalytic Activity

The test was carried out in the apparatus described in FIG. 1. As a model feed gas for $NO_x$ component there was used NO only. More in detail the feed consisted of $NH_3/N_2$, $NO/N_2$, $O_2$, $N_2$. Mass flow meters were used to measure and control the single gaseous stream while an injection pump was used to introduce water. The feed stream was preheated and premixed and ammonia was added to the gaseous mixture immediately before entering the reactor to avoid side reactions. A tubular quartz reactor was employed inserted in a furnace. Temperature was controlled by a thermocouple inserted in the catalyst bed. Activity of the catalysts was measured under stationary as well as dynamic conditions (ramp 5° C./min) in a temperature range of 200° C. to 480° C. There were no major differences in the results between the 2 methods applied.

Gas composition analysis was carried out with an FT-IR spectrometer (MKS Multigas Analyzer 2030) equipped with a heated multi-pass gas cell (5.11 m).

TABLE 1

Reaction conditions and gas composition for catalytic test A

| | |
|---|---|
| Catalyst weight | 100.0 mg |
| Particle size | 355-425 μm |

TABLE 1-continued

Reaction conditions and gas composition for catalytic test A

| | |
|---|---|
| Total flow | 0.3 l/min |
| Space velocity | 180000 h$^{-1}$ |
| Temperature | 200-480° C. (Stationary or with ramp 3° C./min) |
| NO conc. | 200 ppm |
| NH$_3$ conc. | 220 ppm |
| O$_2$ conc. | 20000 ppm |
| H$_2$O conc. | 10% |
| N$_2$ conc. | balance |

B) Catalytic Test with Coated Catalyst (Test B)

Sample and Catalyst Preparation

Powders prepared by the process according to the invention were mixed with approx. 20 weight % of Al$_2$O$_3$ binder (pseudo-boehmit) to an aqueous slurry, the slurry coated on a cordierite substrate (honeycomb) and the water removed by hot air.

Ageing of Catalyst

The catalyst was subjected to calcination (ageing) in a 200 l/h airflow containing 10% H$_2$O at 750°/8 hrs (=Hydrothermal Ageing). Additional ageing was performed at 750°/8 hrs additionally at 750° C. for 20 hrs and partly in a further step at 800° C. for 20 hrs in the presence of 10% water.

Measurement of Catalytic Activity

Unless otherwise reported the reaction conditions given in Table 2 were used.

TABLE 2

Reaction conditions and gas composition

| | |
|---|---|
| Reactor | 2.54 cm |
| Catalyst | Cordierite honeycomb 400 cpsi, h = 5.08 cm, Vol = 25 cm3 |
| Coating | Approx. 120-160 g/Liter (20% binder included) |
| Space velocity | 30 000 h$^{-1}$ |
| Temperature | 200-550° C./ramp of 5° C./min |
| NO$_x$ conc. | 400 ppm at different conditions (a) NO, more than 90% (b) NO$_2$ about 75% (c) NO:NO$_2$ = 1:0.9 to 1.1 |
| NH$_3$:NO$_x$ | 1 |
| O$_2$ conc. | 6% |
| H$_2$O conc. | 7% |
| N$_2$ conc. | balance |

In one aspect the present invention provides compositions based on TiO$_2$/WO$_3$/SiO$_2$ (TWS) comprising Fe-Vanadate and Fe/Er Vanadate dopants with different molar ratios of Fe/Er in the dopants.

Surprisingly it was found that the heat resistance of such catalyst compositions may be specifically controlled by applying defined ratios of the Fe and the Er element in the Fe/Er Vanadate.

Heat resistance of the catalyst compositions is attributed to the inhibition of the formation of rutile out of anatase in the support material (TWS). The inhibition of rutilisation at elevated temperatures (650-750° C.) is clearly depending on the molar ratio of the Fe:Er element in the Mixed Metal Vanadate as shown by XRD analysis in FIG. 2. Whereas in the Fe$_{0.8}$Er$_{0.2}$VO$_4$ containing composition after heat treatment at 750° C./10 hrs significant formation of rutile can be observed and catalytic activity significantly drops compared to the material heat treated at 700° C./10 hrs, the formation of rutile is not observed for a composition Fe$_{0.5}$Er$_{0.5}$VO$_4$ in which the molar ratio of Fe/Er is 1:1.

Accordingly the heat resistance of compositions increases with an increase of Er in the Fe/Er Vanadate dopant. The Rare earth element seems therefore to contribute to the heat stability of the catalyst composition.

In another aspect of the present invention it was found, that catalyst mixtures based on TWS with dopants containing no Rare Earth Elements or not more than 50 mole % of the Rare element such as FeVO$_4$ and Fe/Er VO$_4$ exhibit an improved catalytic activity when compared to the reference materials described in comparative example 1 (commercial catalyst based on TWS containing V$_2$O$_5$) and in comparative example 2 (TWS containing ErVO$_4$) when prepared under the same conditions as the comparative materials. More of the details are disclosed in table 9.

In another aspect the present invention provides compositions based on TWS in which the dopant comprises Fe, Metals of Rare Earths other than Er eg. Sm, Gd or Y; additionally the Fe/Rare Earth Vanadates may contain other transition metals, eg Mn and Zr. For example compositions based on TWS which were doped with Fe$_{0.3}$Sm$_{0.2}$MnVO$_4$ and with Fe$_{0.5}$Y$_{0.02}$Zr$_{0.48}$VO$_4$ exhibit an improved catalytic activity after being heat treated at 650° C./2 hrs in comparison to the comparative example 1 and 2.

In another aspect of the present invention it was surprisingly found that a pre-heattreatment of the Vanadate prior to the mixing with the support will give a significant contribution to the catalytic activity of the mixtures, particularly after ageing of the catalysts at 700° C. and 750° C. respectiveley.

As shown in examples 6, 6b and 6d in table 10 a FeVO$_4$ containing catalyst increases the activity dramatically when the dopant is pre-heattreated at 550° C. or 700° C. prior to the mixing with the support.

The positive influence of the pre-heattreatment of the dopant on the catalytic activity is also clearly demonstrated by the use of Fe$_{0.5}$Er$_{0.5}$VO$_4$ in the example 1, 1a,b,d,e in table 10 when the catalyst is subjected to ageing at 700° C. for 10 hrs.

The positive impact of the pre-heattreatment of the Fe$_{0.5}$Er$_{0.5}$VO$_4$ is further demonstrated for catalyst mixtures which have been aged at 750° C. for 10 hrs (see examples 1, 1a,b,d,e in table 13).

In another aspect the present invention provides compositions based on TWS containing Fe/Rare-Earth-Vanadates the Rare Earth element being other than Erbium such as Gd and Sm. Such catalyst compositions exhibit an improved catalytic activity after ageing at 700° C. for 10 hrs in comparison to the comparative examples 1 and 2 (see examples 10, 12 and 15 in table 10).

In another aspect of the invention it was found that catalyst compositions containing Fe$_{0.5}$Er$_{0.5}$VO$_4$ and Fe$_{0.5}$Gd$_{0.5}$VO$_4$ are extremely heat stable at 700° C. After being heat 50 hrs at 700° C. they even increase their catalytic activity in comparison to the ageing for 10 hrs at 700° C. (see example 1 and 11 in table 10 and 11). The increase of the activity is even more pronounced for the Fe$_{0.5}$Er$_{0.5}$VO$_4$ containing catalyst after ageing for 100 hrs at 700° C. (see example 1 in table 12).

In another aspect of the invention it was surprisingly found that catalyst compositions containing Fe/Er-Vanadates exhibit an excellent activity after being heat treated at 800° C. for 10 hrs. Compositions based on the TWS support containing Fe/Er-Vanadate dopants show an enhanced activity when compared to the ErVO$_4$ containing material (see examples 1, 1,a,b,d,e, 13, 14f) and Comparative examples 2d and 2f in table 14).

In another aspect of the invention an improved low temperature catalytic activity in view of the comparative examples 1 and 2 is provided by applying TiO$_2$/WO$_3$ as a support material which is doped with $Fe_{0.5}Er_{0.5}VO_4$ and $Fe_{0.5}Er_{0.25}Gd_{0.25}VO_4$ respectively as disclose in the examples 18 and 19.

In another aspect the present invention provides compositions based on TWS containing FeEr-Vanadates with different molar ratios of Fe and Er such as $Fe_{0.5}Er_{0.5}VO_4$ and $Fe_{0.8}Er_{0.2}VO_4$ which exhibit a significant increase in catalytic activity in the closer application related catalytic test B in comparison to comparative example 3 (ErVO$_4$ doped TWS) particularly after being aged at 750° C.

The conditions applied for $Fe_{0.5}Er_{0.5}VO_4$ and $Fe_{0.8}Er_{0.2}VO_4$ doped compositions in the ageing procedure were even more harsh (750° C./8 hrs in presence of 10% H$_2$O and additional ageing at 750° C./20 hrs) as for the reference which was subjected to a dry ageing at shorter time only.

Particularly the application of a NO/NO$_2$ containing feedgas in a ratio of 50/50 as demonstrated in the examples 20-25 in table 20 do show very high conversion rates over the whole range of the catalyst operation temperatures.

DETAILED DESCRIPTION OF THE INVENTION

Figure 1:
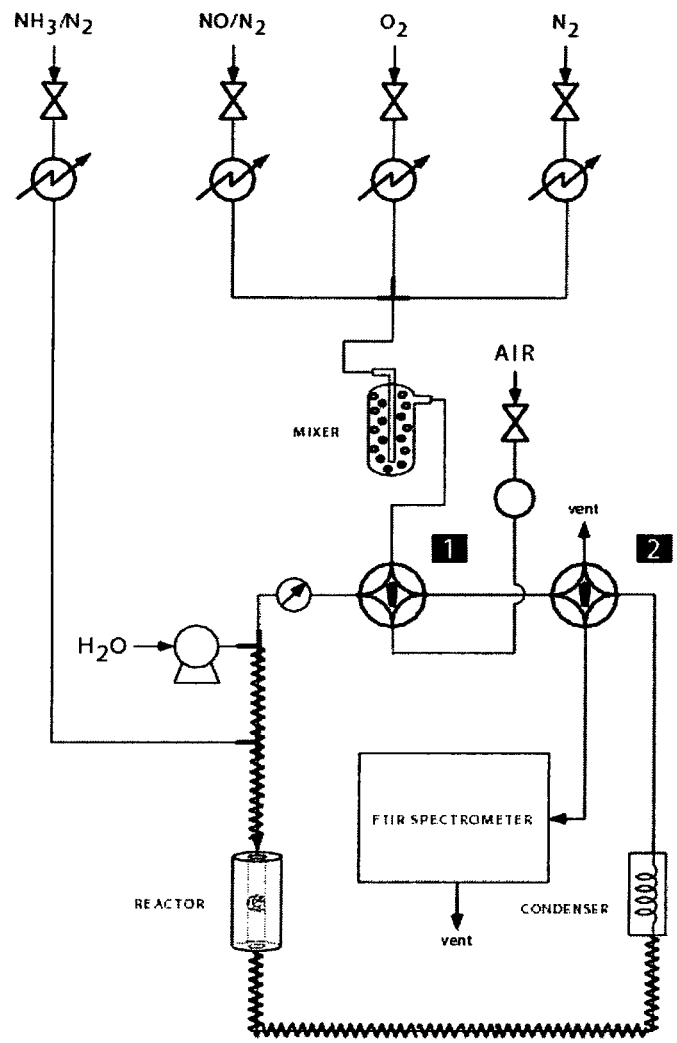
FIG. 1 Scheme of apparatus used for measuring catalytic activity in test A
Figure 2:
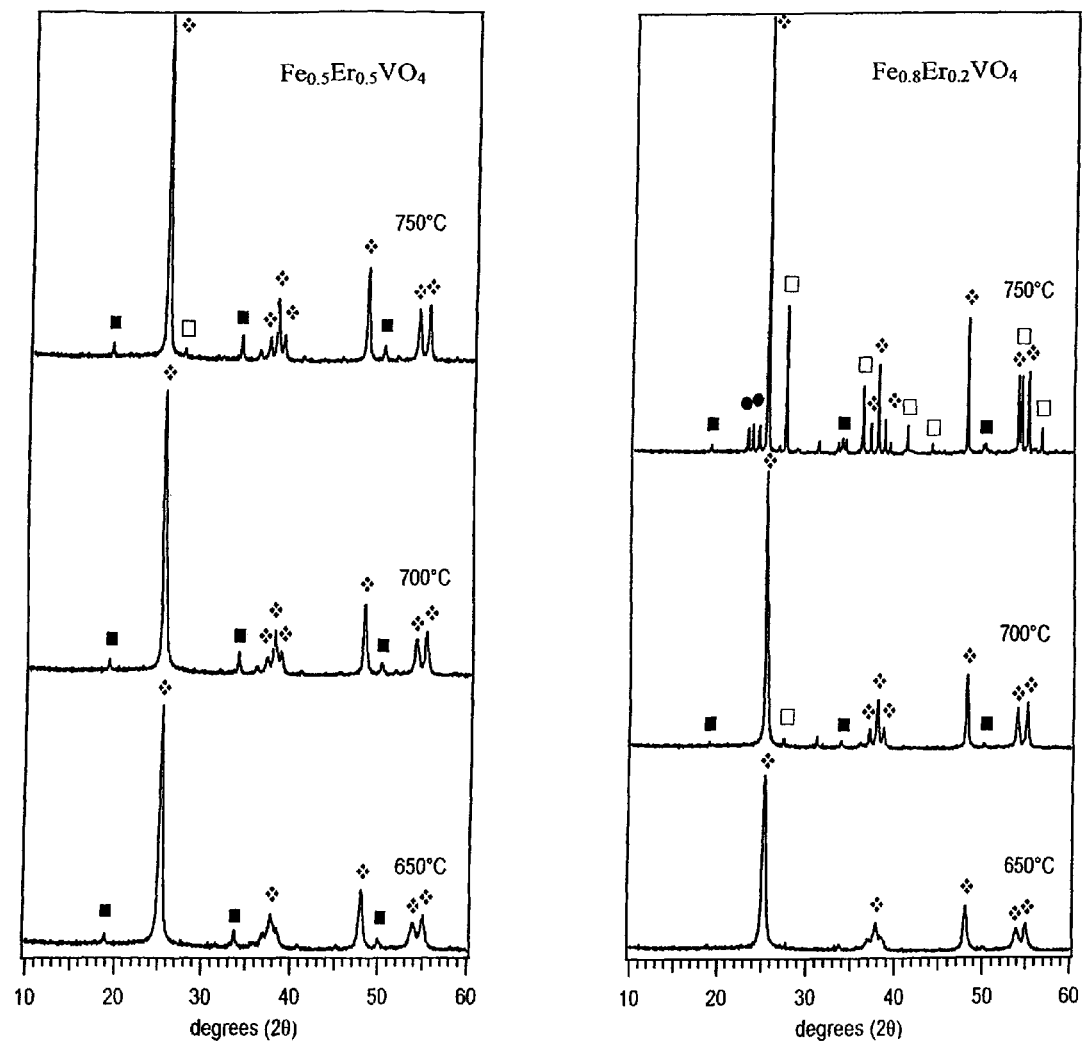
FIG. 2, X-ray diffraction profiles of FeErVO$_4$ doped TWS after heat treatment at 650/700/750° C. (❖ anatase TiO$_2$; □ rutile TiO$_2$; ■ vanadates; ● WO$_3$).
Figure 3:
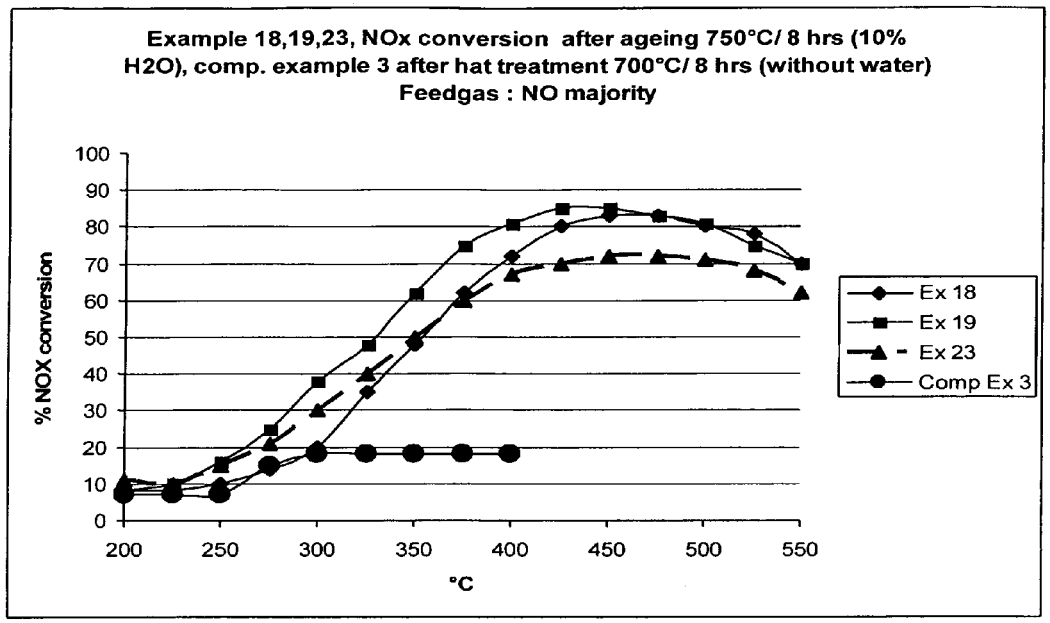
FIG. 3, NO$_x$ conversion activity of catalyst according to example 18,19,23 after ageing of catalyst at 750° C./8 hrs (10% water), and comparative example 3 after heat treatment 700° C./8 hrs (without water) catalytic test B, Feedgas=NO.
Figure 4:
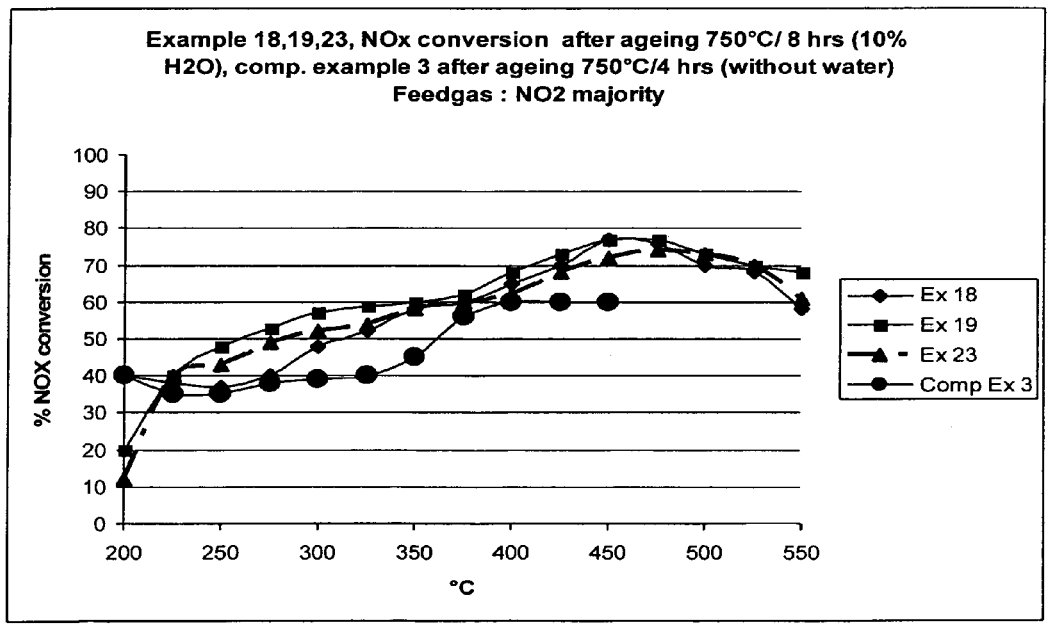
FIG. 4, NO$_x$ conversion activity of catalyst according to example 18,19,23 after ageing of catalyst at 750° C./8 hrs (10% water), and comparative example 3 after heat ageing 750° C./4 hrs (without water) catalytic test B, Feedgas=NO2.
Figure 5:
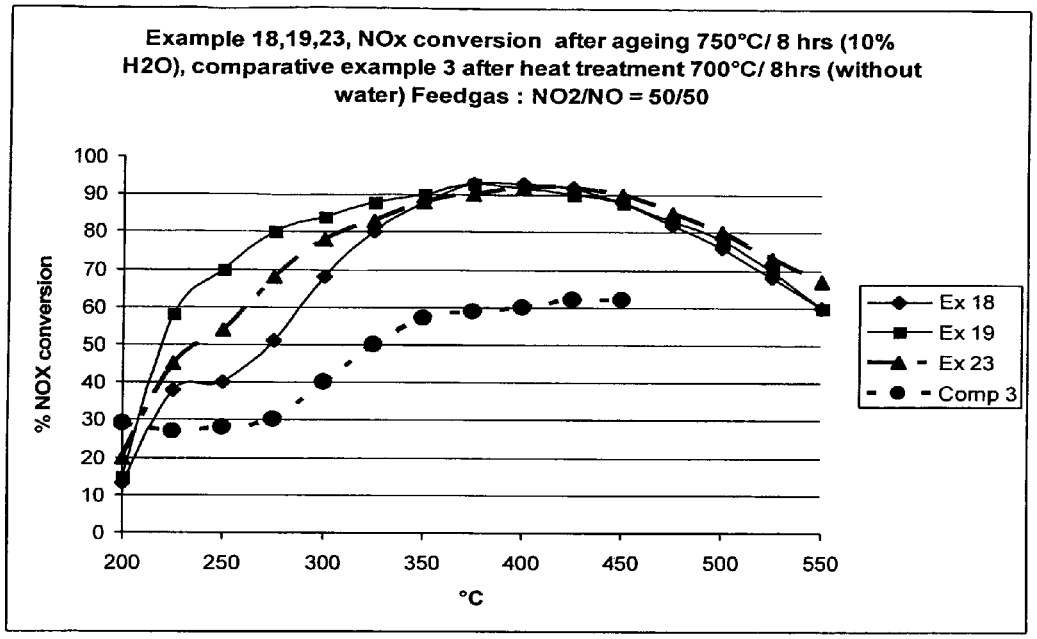
FIG. 5, NO$_x$ conversion activity of catalyst according to example 18,19,23 after ageing of catalyst at 750° C./8 hrs (10% water), and comparative example 3 after heat treatment 700° C./8 hrs (without water) catalytic test B, Feedgas=NO/NO2.
Figure 6:
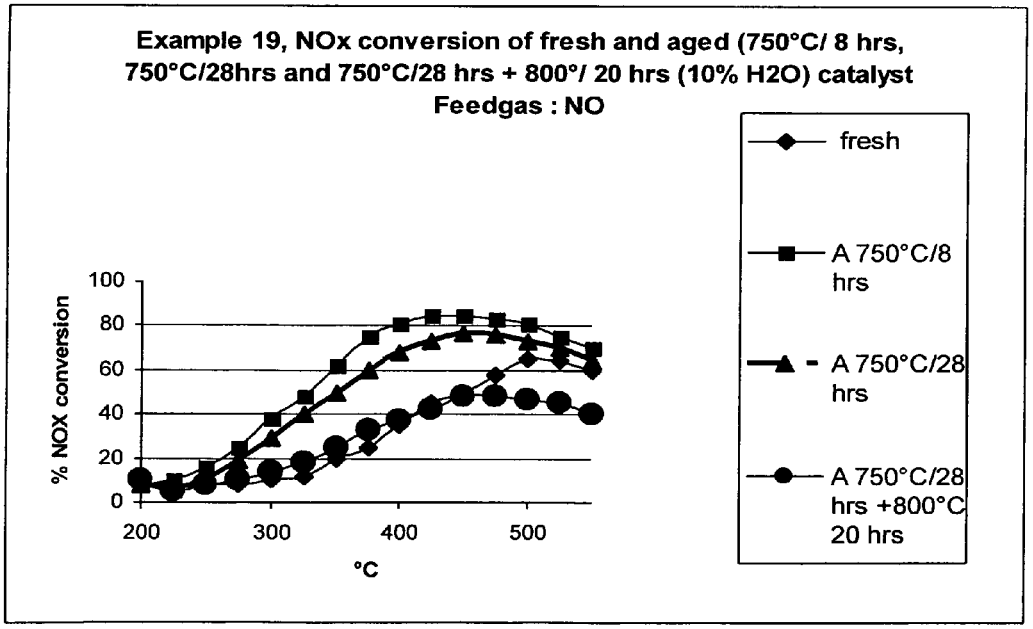
FIG. 6, NO$_x$ conversion activity of catalyst according to example 19, after ageing of catalyst at 750° C./8 hrs (10% water), 750° C./28 hrs (10% water) and 750° C./28 hrs (10% water)+800° C./20 hrs (10% water), catalytic test B, Feedgas=NO.
Figure 7:
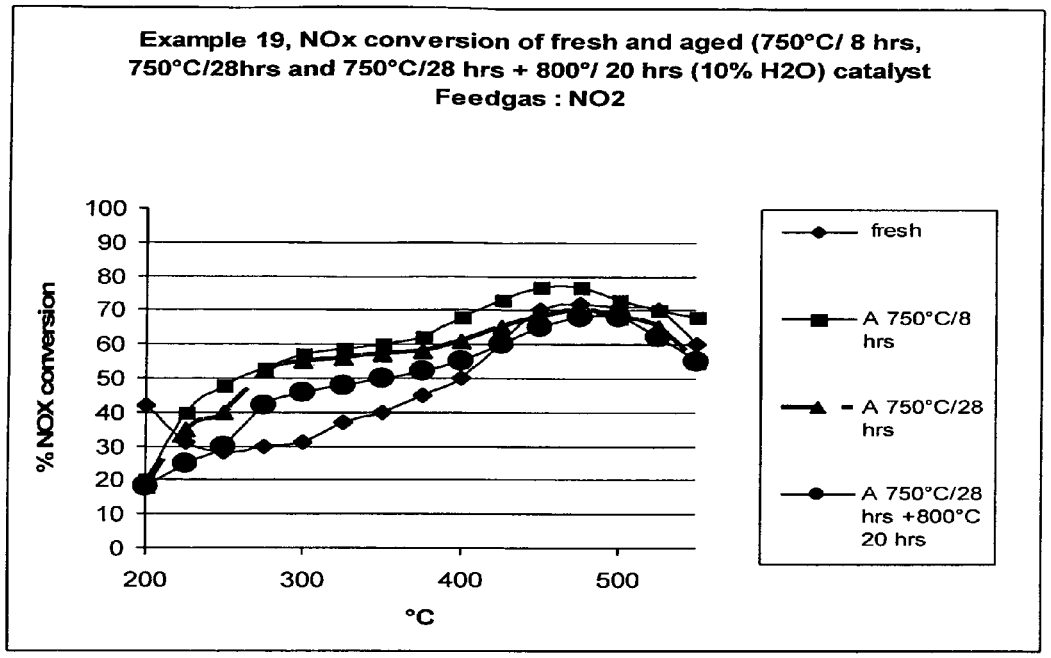
FIG. 7, NO$_x$ conversion activity of catalyst according to example 19, after ageing of catalyst at 750° C./8 hrs (10% water), 750° C./28 hrs (10% water) and 750° C./28 hrs (10% water)+800° C./20 hrs (10% water), catalytic test B, Feedgas=NO$_2$.
Figure 8:
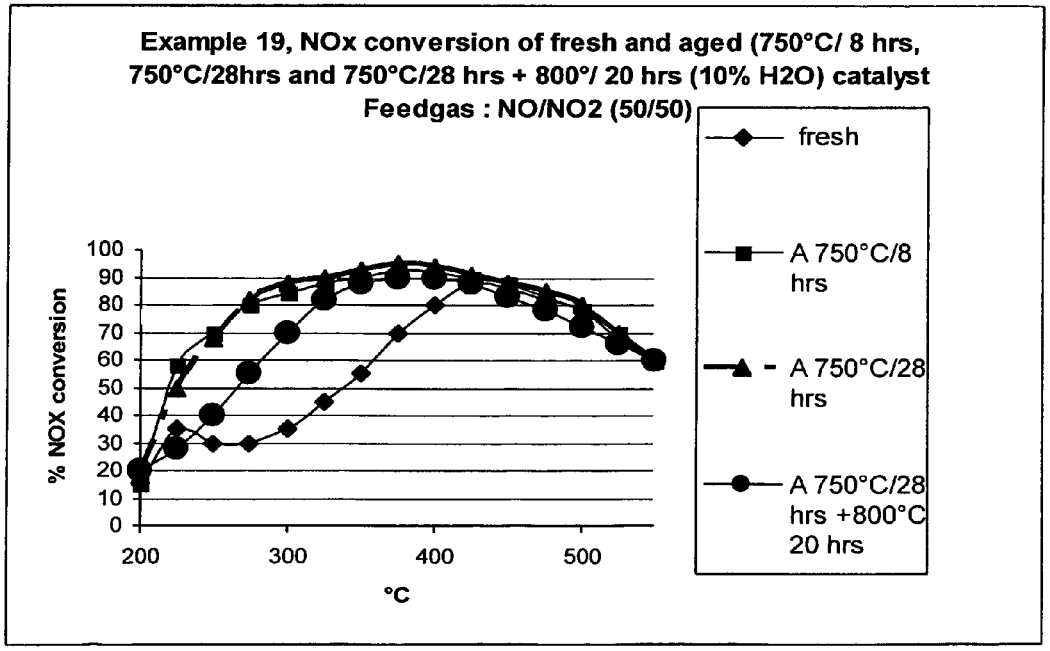
FIG. 8, NO$_x$ conversion activity of catalyst according to example 19, after ageing of catalyst at 750° C./8 hrs (10% water), 750° C./28 hrs (10% water) and 750° C./28 hrs (10% water)+800° C./20 hrs (10% water), catalytic test B, Feedgas=NO/NO$_2$.

In the following preferred embodiments the invention is described more in detail.
1. Support Materials There were used 2 different support materials based on Titaniumoxide which are doped with tungstenoxide. In addition the support material used for the major number of experiments is doped with SiO$_2$. Both materials are commercially available and were sourced from Cristal Global. They are known under the Trade names Tiona DT58 (SiO$_2$ doped material) and DT 52 (TiO$_2$/WO$_3$material).

1.1. TiO$_2$/WO$_3$/SiO$_2$ (TWS)—DT 58

For the preparation of the catalyst compositions there was used a material having the following characteristics:

Specific surface area (BET): 114 m$^2$/g

WO$_3$: 8.8%

SiO$_2$: 9.9%

TiO$_2$: remainder

SO$_3$: 0.16%

P$_2$O$_5$: 0.05%

A synthesis for the support material is described in WO 2005/046864 A1.

1.2 TiO$_2$/WO$_3$ (TW)—DT 52

Specific surface area (BET): 90 m$^2$/g

WO$_3$: 10%

TiO$_2$: remainder

SO$_3$: 1.35%

The preparation of TiO$_2$/WO$_3$ is a well known state of the art process. For example the compound may be prepared applying a description disclosed in U.S. Pat. No. 4,466,947, example 1, in which Titanic acid is impregnated with ammoniumparatungstate. On drying and calcination of the mixture the TiO$_2$/WO$_3$ compound will be formed.

2. Preparation of Metal Vanadates

Compound 1-$Fe_{0.5}Er_{0.5}VO_4$

The stoichiometric amount of iron (III) nitrate nonahydrate (45.2 g; containing 19.5% Fe$_2$O$_3$) and erbium nitrate hexahydrate (50.4 g; containing 41.9% Er$_2$O$_3$) were dissolved in deionised water (318.5 mL) to yield a Mixed Metal Nitrate Solution.

On the other hand, 25.9 g of ammonium metavanadate (AMV, containing 76.1% V$_2$O$_5$) was dissolved in 1100 mL deionised water at 80° C. After mixing the two solutions under continuous stirring, the pH was adjusted to 7.25 by adding 24% ammonia solution. The precipitate so formed was stirred for another half an hour, filtered, washed several times with deionised water and dried at 120° C. overnight yielding 50 g of compound 1. The $Fe_{0.5}Er_{0.5}VO_4$ was analytically characterized by elemental analysis applying X-Ray Fluorescence method (XRF).

TABLE 3

Elemental analysis of $Fe_{0.5}Er_{0.5}VO_4$

|  | V (wt %) | Fe (wt %) | Er (wt %) |
| --- | --- | --- | --- |
| Calculated | 22.49 | 12.33 | 36.92 |
| Found | 21.52 | 13.42 | 36.67 |

Similarly the other Metal- and Mixed Metal Vanadates (compounds 2-17) as shown in table 4 were prepared following the same procedure as referred to for compound 1.

The species and quantities of feedstock materials applied for making the Vanadates (50 g each) are given in Table 4. Erbiumvanadate (ErVO$_4$) which was used in the comparative examples 2 and 3 was prepared according to the description disclosed under 1.4.1 in WO 2005/046864.

TABLE 4

Preparation of Metal Vanadates - Species and quantities of feedstockmaterials applied

| Comp | Vanadate | AMV ($V_2O_5$: 77.6%) [g Mat] | $Fe(NO_3)_3 \times 9H_2O$ ($Fe_2O_3$: 19.5%) [g Mat] | $Er(NO_3)_3 \times 6H_2O$ ($Er_2O_3$: 41.9%) [g Mat] | $Sm(NO_3)_3 \times 6H_2O$ ($Sm_2O_3$: 39.02%) [g Mat] |
|---|---|---|---|---|---|
| 2  | $Fe_{0.9}Er_{0.1}VO_4$ | 32.2 | 101.2 | 12.6 | |
| 3  | $Fe_{0.8}Er_{0.2}VO_4$ | 31.2 | 92.7 | 18.3 | |
| 4  | $Fe_{0.75}Er_{0.25}VO_4$ | 29.5 | 77.2 | 28.7 | |
| 5  | $Fe_{0.65}Er_{0.15}VO_4$ | 27.9 | 63.4 | 38.1 | |
| 6  | $FeVO_4$ | 34.3 | 119.7 | | |
| 7  | $Fe_{0.3}Sm_{0.2}Mn_{0.5}VO_4$ | 34.1 | 40.7 | | 13.6 |
| 8  | $Fe_{0.5}Y_{0.02}Zr_{0.48}VO_4$ | 36 | 62.9 | | |
| 9  | $Fe_{0.1}Ce_{0.5}Mn_{0.4}VO_4$ | 36.8 | 14.6 | | |
| 10 | $Fe_{0.8}Gd_{0.2}VO_4$ | 30.5 | 85.6 | | |
| 11 | $Fe_{0.5}Gd_{0.5}VO_4$ | 26.3 | 46.2 | | |
| 12 | $Fe_{0.3}Sm_{0.7}VO_4$ | 24.6 | 30.1 | | 66.0 |
| 13 | $Fe_{0.2}Er_{0.8}VO_4$ | 13 | 15.8 | 70.2 | |
| 14 | $Fe_{0.1}Er_{0.9}VO_4$ | 22.1 | 7.6 | 75.8 | |
| 15 | $Fe_{0.5}Er_{0.25}Gd_{0.25}VO_4$ | 26.7 | 46.4 | 25.8 | |

| Comp | $Ce(NO_3)_3 \times 6H_2O$ ($CeO_2$: 39.6%) [g Mat] | $Y(NO_3)_3 \times 6H_2O$ ($Y_2O_3$: 23.9%) [g Mat] | $Mn(NO_3)_2 \times 6H_2O$ ($MnO_2$: 34.6%) [g Mat] | ZrNitrate Solution ($ZrO_2$: 21.4%) [g Mat] | $Gd(NO_3)_3 \times 6H_2O$ ($Gd_2O_3$: 40%) [g Mat] |
|---|---|---|---|---|---|
| 2  | | | | | |
| 3  | | | | | |
| 4  | | | | | |
| 5  | | | | | |
| 6  | | | | | |
| 7  | | | 38.3 | | |
| 8  | | 2.3 | | 42.5 | |
| 9  | 36 | | 33 | | |
| 10 | | | | | 23.7 |
| 11 | | | | | 51.2 |
| 12 | | | | | |
| 13 | | | | | |
| 14 | | | | | |
| 15 | | | | | 25.3 |

The compounds 2-15 were analytically characterized by elemental analysis using XRF-technique and the software program "Uniquant". Due to lack of standardized reference samples the analytical method will have an uncertainty of approx. +/−5% in the reported values.

Data of elemental analysis are referred to in Table 5.

TABLE 5

Elemental analysis of Vanadates prepared

| | | V (wt %) | | Fe (wt %) | | RE**) (wt %) | |
|---|---|---|---|---|---|---|---|
| Comp | Vanadate-Dopant | Calc. | found | Calc. | found | Calc. | found |
| 2    | $Fe_{0.9}Er_{0.1}VO_4$ | 28.0 | 26.4 | 27.6 | 29.2 | 9.2 | 9.4 |
| 3    | $Fe_{0.8}Er_{0.2}VO_4$ | 26.4 | 25.5 | 23.1 | 23.6 | 17.3 | 17.7 |
| 4    | $Fe_{0.75}Er_{0.25}VO_4$ | 25.6 | 23.5 | 21.1 | 22.8 | 21.1 | 21.7 |
| 5    | $Fe_{0.65}Er_{0.15}VO_4$ | 24.2 | 22.5 | 17.3 | 18.8 | 27.9 | 28.5 |
| 6    | $FeVO_4$ | 29.8 | 27.2 | 32.7 | 35.4 | | |
| 7    | $Fe_{0.3}Sm_{0.2}Mn_{0.5}VO_4$ | 29.7 | 28.3 | 11.1 | 11.5 | 9.15 | 9.15 |
| 8*)  | $Fe_{0.5}Y_{0.02}Zr_{0.48}VO_4$ | 31.3 | 26.6 | 17.1 | 19.9 | 1.5 | 1.1 |
| 9*)  | $Fe_{0.1}Ce_{0.5}Mn_{0.4}VO_4$ | 31.9 | 27.8 | 4.0 | 3.8 | 23.2 | 21.5 |
| 10   | $Fe_{0.8}Gd_{0.2}VO_4$ | 26.6 | 25.4 | 23.4 | 24.8 | 16.5 | 16.4 |
| 11   | $Fe_{0.5}Gd_{0.5}VO_4$ | 23.0 | 21.5 | 12.6 | 13.7 | 35.5 | 35.7 |
| 12   | $Fe_{0.3}Sm_{0.7}VO_4$ | 21.5 | 21.5 | 7.1 | 7.3 | 44.4 | 43.6 |
| 13   | $Fe_{0.2}Er_{0.8}VO_4$ | 19.6 | 19 | 4.3 | 4.7 | 51.5 | 51.5 |
| 14   | $Fe_{0.1}Er_{0.9}VO_4$ | 18.8 | 20.0 | 2.1 | 2.1 | 55.5 | 52.8 |
| 15   | $Fe_{0.5}Er_{0.25}Gd_{0.25}VO_4$ | 22.7 | 22.5 | 12.5 | 13.2 | 36.2 | 35.5 |
| Comp 2 | $ErVO_4$ | 17.0 | 17.2 | — | — | 55.7 | 56.5 |

*)according to XRD in the compounds 8-9 there were detected $ZrV_2O_7$ and $MnV_2O_7$ phases
**)RE = Er, Sm, Gd, Y, Ce Metal-Vanadates (compounds 1, 6 and 13 and Comp 2 as listed in table 5) were also subjected to heat treatment in a muffle furnace at temperatures from 500-850° C. prior to the mixing with the support material TWS (DT 58) for making the catalyst. The compounds prepared (Heat treated Metal-Vanadates) and the conditions applied in the heat treatment step are listed in table 5a.

TABLE 5a

Heat treated Metal Vanadates and conditions applied in the heat treatment step

| Comp | Metal-Vanadate | Heat Treatment Conditions [° C./hrs] |
|---|---|---|
| 1a | $Fe_{0.5}Er_{0.5}VO_4$ | 500/20 |
| 1c | $Fe_{0.5}Er_{0.5}VO_4$ | 600/20 |
| 1d | $Fe_{0.5}Er_{0.5}VO_4$ | 700/20 |
| 1e | $Fe_{0.5}Er_{0.5}VO_4$ | 800/20 |
| 6b | $FeVO_4$ | 550/24 |
| 6d | $FeVO_4$ | 700/20 |
| 13d | $Fe_{0.1}Er_{0.9}VO_4$ | 700/20 |
| 13f | $Fe_{0.1}Er_{0.9}VO_4$ | 850/20 |
| Comp 2d | $ErVO_4$ | 700/20 |
| Comp 2f | $ErVO_4$ | 850/20 |

3. Preparation of the Catalyst Compositions 3.1. Preparation of the Catalyst Compositions using $TiO_2/WO_3/SiO_2$ (TWS) as a Support Material; Catalysts Used in Catalytic Standard Test (A)

EXAMPLE 1

Preparation of Catalyst Composition $TiO_2/WO_3/SiO_2$: $Fe_{0.5}ER_{0.5}VO_4$

Two slurries were formed by suspending 0.2523 g of $Fe_{0.5}Er_{0.5}VO_4$ in 5 mL deionised water and 2.7477 g of $TiO_2/WO_3/SiO_2$ support material in 10 mL deionised water. The two slurries were mixed and heated up to 90° C. while stirring. The slurry was brought to dryness under continuous stirring at 80-100° C. and the residue finally dried overnight at 120° C. followed by calcinations at 650° C./2 h under air in a muffle furnace. Ultimately the so obtained dried mixture was pressed into pellets, crushed and sieved in range 355-425 μm.

This material is considered as "fresh" material.

Aging of sample was carried out by calcination of the material at a temperature of 700° C. for 10 hrs and 100 hrs and at 750° C., and at 800° C. for 10 hours in air in a muffle furnace.

The composition refers to a calculated V content of 1.9%.

BET of the catalyst composition was measured after calcination at 650° C./2 hrs (fresh material), 700° C./10 hrs (aged), 700° C./100 hrs, 750° C./10 hrs (aged) and 800° C./10 hrs (aged) and showed a value of 72 m²/g, 60 m²/g, 39 m²/g, 31 m²/g and 19 m²/g respectiveley.

EXAMPLES 1a-15

Preparation of Catalyst Compositions $TiO_2/WO_3/SiO_2$: $MeVO_4$ as Listed in Table 7.

The catalyst compositions referred to in examples 1a-15 and as disclosed in table 7 were prepared according to the same procedure as disclosed in example 1.

The quantities of the support material ($TiO_2/WO_3/SiO_2$), the species and the quantities of Me-Vanadates used for the preparation of the catalyst compositions as well as the applied ageing temperatures and ageing times are listed in table 6.

TABLE 6

Examples 1a-15 - Quantities of TWS and Vanadates used for preparation of catalyst compositions and ageing conditions applied prior to catalytic testing

| Example | Vanadate Species | Preheat-treatment of Vanadate [° C./hrs] | TWS [g] | MeVO4 [g] | Ageing ° C./hrs |
|---|---|---|---|---|---|
| 1a | $Fe_{0.5}Er_{0.5}VO_4$ | 500/20 | 2.7477 | 0.2523 | 700/10; 750/10; 800/10 |
| 1c | $Fe_{0.5}Er_{0.5}VO_4$ | 600/20 | 2.7477 | 0.2523 | 700/10; 750/10; 800/10 |
| 1d | $Fe_{0.5}Er_{0.5}VO_4$ | 700/20 | 2.7477 | 0.2523 | 700/10; 750/10; 800/10 |
| 1e | $Fe_{0.5}Er_{0.5}VO_4$ | 800/20 | 2.7477 | 0.2523 | 700/10; 750/10; 800/10 |
| 2 | $Fe_{0.5}Er_{0.1}VO_4$ | none | 2.7477 | 0.2523 | |
| 3 | $Fe_{0.8}Er_{0.2}VO_4$ | none | 2.7477 | 0.2523 | 700/10 |
| 4 | $Fe_{0.75}Er_{0.25}VO_4$ | none | 2.7477 | 0.2523 | 700/10; 750/10; |
| 5 | $Fe_{0.65}Er_{0.35}VO_4$ | none | 2.7477 | 0.2523 | |
| 6 | $FeVO_4$ | none | 2.7477 | 0.2523 | 700/10 |
| 6b | $FeVO_4$ | 550/24 | 2.7477 | 0.2523 | 700/10; 750/10; |
| 6d | $FeVO_4$ | 700/20 | 2.7477 | 0.2523 | 700/10 |
| 7 | $Fe_{0.3}Sm_{0.2}Mn_{0.5}VO_4$ | none | 2.7477 | 0.2523 | |
| 8 | $Fe_{0.5}Y_{0.02}Zr_{0.48}VO_4$ | none | 2.7477 | 0.2523 | |
| 9 | $Fe_{0.1}Ce_{0.5}Mn_{0.4}VO_4$ | none | 2.7477 | 0.2523 | |
| 10 | $Fe_{0.8}Gd_{0.2}VO_4$ | none | 2.7477 | 0.2523 | 700/10 |
| 11 | $Fe_{0.5}Gd_{0.5}VO_4$ | none | 2.7477 | 0.2523 | 700/10; 700/50; 700/100; 750/10; |
| 12 | $Fe_{0.3}Sm_{0.7}VO_4$ | none | 2.7477 | 0.2523 | 700/10; 750/10; |
| 13 | $Fe_{0.2}Er_{0.8}VO_4$ | none | | | |
| 14d | $Fe_{0.1}Er_{0.9}VO_4$ | 700/20 | 2.7477 | 0.2523 | 800/10; |
| 14f | $Fe_{0.1}Er_{0.9}VO_4$ | 850/20 | 2.7477 | 0.2523 | 800/10; |
| 15 | $Fe_{0.5}Er_{0.25}Gd_{0.25}VO_4$ | none | 2.7477 | 0.2523 | 700/10; 750/10 |

COMPARATIVE EXAMPLE 1

Commercial Catalyst Composition based on $TiO_2/WO_3/SiO_2$: $V_2O_5$

A commercial available catalyst (monolith) based on the composition $TiO_2/WO_3/SiO_2$: $V_2O_5$ was crushed and sieved over 450 μm and 250 μm. The fraction between 250 μm and 450 μm was heat treated at 650° C./2 hrs Aging of sample was carried out by calcination of the material at a temperature of 700° C. for 10 hours in air.

COMPARATIVE EXAMPLES 1.1

Catalyst Composition Based on $TiO_2/WO_3/SiO_2$: $V_2O_5$ Prepared by Slurry Method 77.2 mg of Ammoniummetavanadate were dissolved in 10 ml of 1N Oxalic Acid to form the blue complex of Ammoniumvanadyloxalate $(NH_4)_2[VO(C_2O_4)_2]$. Then 1940 g of TWS support was added. The slurry was brought to dryness under continuous stirring at 80-100° C. Finally the solid was dried at 120° C. overnight and calcined at 650° C. for 2 hrs, pressed into pellet, crushed and sieved in the range 355-425 μm.

Aging of sample was carried out by calcination of the material at a temperature of 750° C. for 10 hours in air.

COMPARATIVE EXAMPLE 2

Preparation of Catalyst Composition $TiO_2/WO_3/SiO_2$: $ErVO_4$

Two slurries were formed by dissolving 0.2523 g of $ErVO_4$ in 5 mL deionised water and 2.7477 g of $TiO_2/WO_3/SiO_2$ support material in 10 mL deionised water. The two slurries were mixed and heated up to 90° C. while stirring. The slurry was brought to dryness under continuous stirring at 80-100° C. and the residue finally dried overnight at 120° C. followed by calcinations at 650° C./2 h under air in a muffle furnace. Ultimately the so obtained dried mixture was pressed into pellets, crushed and sieved in range 355-425 μm.

This material is considered as "fresh" material.

Aging of sample was carried out by calcination of the material at a temperature of 700° C. for 10 hours in air.

The calculated V-content of the catalyst compositions prepared in examples 1a-15 as well as for the comparative examples 1 and 2 is given in table 7. There are also listed several BET values reported for the materials calcined at different temperatures (range from 650° C. up to 800° C.)

TABLE 7

Example 1a-15 and comparative example 1, 2; TWS based catalyst compositions, species of dopant, V-content of catalyst compositions and BET values after heat treatment

| Example | Vanadate Species | Preheat-treatment of Vanadate [° C./hrs] | V-content Cat. Comp. [%] | BET 650°/2 hrs [m2/g] | BET 700°/10 hrs [m2/g] | BET 750°/10 hrs [m2/g] | BET 800°/10 hrs [m2/g] |
| --- | --- | --- | --- | --- | --- | --- | --- |
| 1a | $Fe_{0.5}Er_{0.5}VO_4$ | 500/20 | 1.9 | 86 | 60 | 45 | 14 |
| 1c | $Fe_{0.5}Er_{0.5}VO_4$ | 600/20 | 1.9 | 84 | 60 | 46 | 15 |
| 1d | $Fe_{0.5}Er_{0.5}VO_4$ | 700/20 | 1.9 | 86 | 60.5 | 47 | 21 |
| 1e | $Fe_{0.5}Er_{0.5}VO_4$ | 800/20 | 1.9 | 91 | 64 | 51 | 28 |
| 2 | $Fe_{0.9}Er_{0.1}VO_4$ | none | 2.4 | 60 | 10 | 6 | |
| 3 | $Fe_{0.8}Er_{0.2}VO_4$ | none | 2.2 | 66 | 31 | 7 | |
| 4 | $Fe_{0.75}Er_{0.25}VO_4$ | none | 2.2 | 68 | 26 | 8 | |
| 5 | $Fe_{0.65}Er_{0.35}VO_4$ | none | 2.1 | 70 | 43 | 13 | |
| 6 | $FeVO_4$ | none | 2.5 | 63 | 15 | 4 | |
| 6b | $FeVO_4$ | 550/24 | 2.5 | 81 | 38 | | |
| 6d | $FeVO_4$ | 700/20 | 2.5 | 86 | 44 | | |
| 7 | $Fe_{0.3}Sm_{0.2}Mn_{0.5}VO_4$ | none | 2.3 | 38 | 3 | 3 | |
| 8 | $Fe_{0.5}Y_{0.02}Zr_{0.48}VO_4$ | none | 2.3 | 66 | 6 | 5 | |
| 9 | $Fe_{0.1}Ce_{0.5}Mn_{0.4}VO_4$ | none | 2.0 | 36 | 2.5 | 2.4 | |
| 10 | $Fe_{0.8}Gd_{0.2}VO_4$ | none | 2.2 | 68 | 17 | | |
| 11 | $Fe_{0.5}Gd_{0.5}VO_4$ | none | 1.9 | 77 | 54 (53 at 700° C./50 hrs) | | |
| 12 | $Fe_{0..3}Sm_{0.7}VO_4$ | none | 1.8 | 83 | 54 | | |
| 13 | $Fe_{0.2}Er_{0.8}VO_4$ | none | 1.6 | | | | |
| 14d | $Fe_{0.1}Er_{0.9}VO_4$ | 700/20 | 1.6 | 90 | | | 48 |
| 15 | $Fe_{0.5}Er_{0.25}Gd_{0.25}VO_4$ | none | 1.9 | 82 | 57 | 39 | |
| Comp 1 | $V_2O_5$ | none | 1.7 | 44 | 23 | 7 | |
| Comp 2 | $ErVO_4$ | none | 1.5 | 92 | 68 | 55 | |
| Comp 2d | $ErVO_4$ | 700/20 | 1.5 | 91 | | | 52 |

3.2. Preparation of the Catalyst Compositions Using $TiO_2$/$WO_3$ (TW) as a Support Material; Catalysts Used in Catalytic Standard Test (A)

EXAMPLE 16

Preparation of Catalyst Composition $TiO_2$/$WO_3$: $Fe_{0.5}Er_{0.5}VO_4$

Two slurries were formed by suspending 0.2523 g of $Fe_{0.5}Er_{0.5}VO_4$ in 5 mL deionised water and 2.7477 g of $TiO_2$/$WO_3$ support material in 10 mL deionised water. The two slurries were mixed and heated up to 90° C. while stirring. The slurry was brought to dryness under continuous stirring at 80-100° C. and the residue finally dried overnight at 120° C. followed by calcinations at 650° C./2 h under air in a muffle furnace. Ultimately the so obtained dried mixture was pressed into pellets, crushed and sieved in range 355-425 µm.

This material is considered as "fresh" material.

Aging of sample was carried out by calcination of the "fresh" material at a temperature of 700° C. for 10 hrs in air in a muffle furnace.

The composition refers to a calculated V content of 1.9%.

BET of the catalyst composition was measured after calcination at 650° C./2 hrs (fresh material), and after ageing 700° C./10 hrs and showed a value of 41 $m^2$/g and 14 $m^2$/g, respectively.

EXAMPLE 17

Preparation of Catalyst Composition $TiO_2$/$WO_3$: $Fe_{0.5}Er_{0.25}Gd_{0.25}VO_4$ The catalyst was prepared exactly in the same way as disclosed in example 18 but using 0.2523 g of $Fe_{0.5}Er_{0.25}Gd_{0.25}VO_4$ instead of $Fe_{0.5}Er_{0.5}VO_4$.

Aging of sample was carried out by calcination of the "fresh" material at a temperature of 700° C. for 10 hrs in air in a muffle furnace.

The composition refers to a calculated V content of 1.9%.

BET of the catalyst composition was measured after calcination at 650° C./2 hrs (fresh material), and after ageing 700° C./10 hrs and showed a value of 38 $m^2$/g and 14.5 $m^2$/g, respectiveley.

3.3. Preparation of the Catalyst Compositions and of Catalyst Used for Catalytic Test B

EXAMPLE 18

Preparation of Catalyst Composition—$TiO_2$/$WO_3$/$SiO_2$: $Fe_{0.5}Er_{0.5}VO_4$ with 8.4% Dopant Content Two slurries were formed by suspending 8.41 g of $Fe_{0.5}Er_{0.5}VO_4$ in 100 mL deionised water and 91.6 g of $TiO_2$/$WO_3$/$SiO_2$ support material in 150 mL deionised water. The two slurries were mixed, stirred for 2 hrs and then heated up to 90° C. while stirring. The slurry was brought to dryness under continuous stirring at 80-100° C. and the residue finally dried overnight at 120° C.

The composition was calcined at 650° C./2 hrs prior to introduction to the coating process on a cordierite honeycomb.

The composition refers to a calculated V content of 1.9%

Preparation of coated catalyst

A cordierite honeycomb having a cell density of 400 cpsi, a height of 5.08 cm and a volume of 25 $cm^3$ was coated with a slurry of a mixture of the catalyst composition $TiO_2$/$WO_3$/$SiO_2$: $Fe_{0.5}Er_{0.5}VO_4$ and $Al_2O_3$ (Pural NG—commercial product from SASOL, Anckelmannsplatz 1, 20537 Hamburg). The slurry applied contained 128 g $TiO_2$/$WO_3$/$SiO_2$: $Fe_{0.5}Er_{0.5}VO_4$ and 32 g $Al_2O_3$ (as a binder) which corresponds to a slurry concentration of 160 g/Liter (catalyst composition and binder).

After impregnation of the honeycomb with the slurry the catalyst was dried with a hot air stream.

Hydrothermal ageing of the catalyst was performed at 750° C. for 8 hrs in an air stream containing 10% water at an air flow rate of 200 Liter/h.

EXAMPLE 19

Preparation of Catalyst Composition—$TiO_2$/$WO_3$/$SiO_2$: $Fe_{0.5}Er_{0.5}VO_4$ with 15% Dopant Content The catalysts composition was prepared according to example 20 with the exception that 15 g of $Fe_{0.5}Er_{0.5}VO_4$ and 85.0 g of $TiO_2$/$WO_3$/$SiO_2$ support material were used The composition was calcined at 650° C./2 hrs prior to introduction to the coating on a cordierite honeycomb.

The composition refers to a calculated V content of 3.4% V.

Preparation of coated catalyst

A cordierite honeycomb having a cell density of 400 cpsi, a height of 5.08 cm and a volume of 25 $cm^3$ was coated with a slurry of a mixture of the catalyst composition $TiO_2$/$WO_3$/$SiO_2$: $Fe_{0.5}Er_{0.5}VO_4$ and $Al_2O_3$ (Pural NG—commercial product from SASOL, Anckelmannsplatz 1, 20537 Hamburg). The slurry applied contained 116.8 g $TiO_2$/$WO_3$/$SiO_2$: $Fe_{0.5}Er_{0.5}VO_4$ (weight percent ratio=85/15) and 29.2 g $Al_2O_3$ (as a binder) which corresponds to a slurry concentration of 146 g/Liter (catalyst composition and binder).

After impregnation of the honeycomb with the slurry the catalyst was dried with a hot air stream.

Hydrothermal ageing of the catalyst was performed at 750° C. for 8 hrs in an air stream containing 10% water at an air flow rate of 200 Liter/h. The catalyst aged at 750° C./8 hrs was subjected to an additional ageing at 750° C./20 hrs and afterwards to a further ageing at 800° C./20 hrs in an air stream containing 10% water at an air flow rate of 200 Liter/h.

EXAMPLE 20

Preparation of Catalyst Composition—$TiO_2$/$WO_3$/$SiO_2$: $Fe_{0.8}Er_{0.2}VO_4$ with 8.4% Dopant Content.

The composition was prepared exactly as disclosed in example 18 but using 8.41 g of $Fe_{0.8}Er_{0.2}VO_4$.

The composition was calcined at 650° C./2 hrs prior to introduction to the coating on a cordierite honeycomb.

The composition refers to a calculated V content of 2.2%

Preparation of coated Catalyst

A cordierite honeycomb having a cell density of 400 cpsi, a height of 5.08 cm and a volume of 25 $cm^3$ was coated with a slurry of a mixture of the catalyst composition $TiO_2$/$WO_3$/$SiO_2$: $Fe_{0.8}Er_{0.2}VO_4$ and $Al_2O_3$ (Pural NG—commercial product from SASOL, Anckelmannsplatz 1, 20537 Hamburg). The slurry applied contained 97.6 g $TiO_2$/$WO_3$/$SiO_2$: $Fe_{0.8}Er_{0.2})VO_4$ and 24.4 g $Al_2O_3$ (as a binder) which corresponds to a slurry concentration of 122 g/Liter (catalyst composition and binder).

After impregnation of the honeycomb with the slurry the catalyst was dried with a hot air stream.

Hydrothermal ageing of the catalyst was performed at 750° C. for 8 hrs in an air stream containing 10% water at a flow rate of 200 Liter/h.

EXAMPLE 21

Preparation of Catalyst Composition—TiO$_2$/WO$_3$/SiO$_2$: Fe$_{0.8}$Er$_{0.2}$VO$_4$ with 15% Dopant Content.

The composition was prepared exactly as disclosed in example 19 but using 15 g of Fe$_{0.8}$Er$_{0.2}$VO$_4$.

The composition was calcined at 650° C./2 hrs prior to introduction to the coating on a cordierite honeycomb.

The composition refers to a calculated V content of 4.0%

Preparation of Coated Catalyst

A cordierite honeycomb having a cell density of 400 cpsi, a height of 5.08 cm and a volume of 25 cm$^3$ was coated with a slurry of a mixture of the catalyst composition TiO$_2$/WO$_3$/SiO$_2$: Fe$_{0.8}$Er$_{0.2}$VO$_4$ (weight % ratio TWS/Dopant=100/15) and Al$_2$O$_3$ (Pural NG—commercial product from SASOL, Anckelmannsplatz 1, 20537 Hamburg). The slurry applied contained 104 g TiO$_2$/WO$_3$/SiO$_2$: Fe$_{0.8}$Er$_{0.2}$)VO$_4$ and 26 g Al$_2$O$_3$ (as a binder) which corresponds to a slurry concentration of 130 g/Liter (catalyst composition and binder).

After impregnation of the honeycomb with the slurry the catalyst was dried with a hot air stream.

Hydrothermal ageing of the catalyst was performed at 750° C. for 8 hrs in an air stream containing 10% water at a flow rate of 200 Liter/h.

EXAMPLE 22

Preparation of Catalyst Composition—TiO$_2$/WO$_3$/SiO$_2$: Fe$_{0.5}$Er$_{0.5}$VO$_4$ with 15% Dopant Content The catalysts composition was prepared according to example 19 with the exception that no precalcination of the powder prior to the coating was applied.

The composition refers to a calculated V content of 3.4% V.

Preparation of Coated Catalyst

A cordierite honeycomb having a cell density of 400 cpsi, a height of 5.08 cm and a volume of 25 cm$^3$ was coated with a slurry of a mixture of the catalyst composition TiO$_2$/WO$_3$/SiO$_2$: Fe$_{0.5}$Er$_{0.5}$VO$_4$ and Al$_2$O$_3$ (Pural NG—commercial product from SASOL, Anckelmannsplatz 1, 20537 Hamburg). The slurry applied contained 104.8 g TiO$_2$/WO$_3$/SiO$_2$: Fe$_{0.5}$Er$_{0.5}$VO$_4$ (weight percent ratio=85/15) and 26.2 g Al$_2$O$_3$ (as a binder) which corresponds to a slurry concentration of 130 g/Liter (catalyst composition and binder).

After impregnation of the honeycomb with the slurry the catalyst was dried with a hot air stream and subjected to calcination at 700° C. for 20 hrs in a muffle furnace.

Hydrothermal ageing of the catalyst was performed at 750° C. for 8 hrs in an air stream containing 10% water at an air flow rate of 200 Liter/h.

The catalyst aged at 750° C./8 hrs was subjected to an additional ageing at 750° C./20 hrs in an air stream containing 10% water at an air flow rate of 200 Liter/h.

EXAMPLE 23

Preparation of Catalyst Composition—TiO$_2$/WO$_3$/SiO$_2$: Fe$_{0.5}$Er$_{0.5}$VO$_4$ with 15% Dopant Content The catalysts composition was prepared according to example 22.

The composition refers to a calculated V content of 3.4% V.

Preparation of Coated Catalyst

A cordierite honeycomb having a cell density of 400 cpsi, a height of 5.08 cm and a volume of 25 cm$^3$ was coated with a slurry of a mixture of the catalyst composition TiO$_2$/WO$_3$/SiO$_2$: Fe$_{0.5}$Er$_{0.5}$VO$_4$ and Al$_2$O$_3$ (Pural NG—commercial product from SASOL, Anckelmannsplatz 1, 20537 Hamburg). The slurry applied contained 115.2 g TiO$_2$/WO$_3$/SiO$_2$: Fe$_{0.5}$Er$_{0.5}$VO$_4$ (weight percent ratio=85/15) and 28.8 g Al$_2$O$_3$ (as a binder) which corresponds to a slurry concentration of 144 g/Liter (catalyst composition and binder).

After impregnation of the honeycomb with the slurry the catalyst was dried with a hot air stream and subjected to calcination at 700° C. for 50 hrs in a muffle furnace.

Hydrothermal ageing of the catalyst was performed at 750° C. for 8 hrs in an air stream containing 10% water at an air flow rate of 200 Liter/h.

The catalyst aged at 750° C./8 hrs was subjected to an additional ageing at 750° C./20 hrs in an air stream containing 10% water at an air flow rate of 200 Liter/h.

COMPARATIVE EXAMPLE 3

Preparation of Catalyst Composition—TiO$_2$/WO$_3$/SiO$_2$: ErVO$_4$

The preparation of TiO$_2$/WO$_3$/SiO$_2$: ErVO$_4$ refers to the procedure as disclosed in WO 2005/046864.

Thus 6.3 g of ErVO$_4$ and 68.7 g of TiO$_2$/WO$_3$/SiO$_2$ support material were suspended in 150 mL deionised water over a period of 2 hrs. The slurry was brought to dryness under continuous stirring at approx. 60° C. and the residue finally dried overnight at 120° C. The composition was calcined at 700° C./8 hrs prior to introduction to the coating process on a cordierite honeycomb.

The composition refers to a calculated V content of 1.5%

Preparation of Coated Catalyst

A cordierite honeycomb having a cell density of 400 cpsi, a height of 2.54 cm and a volume of 12.5 cm$^3$ was coated with a slurry of a mixture of the catalyst composition TiO$_2$/WO$_3$/SiO$_2$: ErVO$_4$ and colloidal SiO$_2$ as a binder. The slurry applied contained 143.1 g TiO$_2$/WO$_3$/SiO$_2$: ErVO$_4$ and 15.9 g SiO$_2$ (as a binder) which corresponds to a slurry concentration of 159 g/Liter (catalyst composition and binder).

After impregnation of the honeycomb with the slurry the catalyst was dried with a hot air stream.

Ageing of the catalyst was performed at 700° C./4 hrs and 750° C./4 hrs respectively.

4. Catalytic Testing 4.1 Standard Test A

Standard Test A was performed according to the parameters disclosed in the table 8

TABLE 8

| Reaction condition and gas composition | |
|---|---|
| Catalyst weight | 100.0 mg |
| Particle size | 355-425 μm |
| Total flow | 0.3 l/min |
| Space velocity | 180000 h$^{-1}$ |
| Temperature | 200-480° C. |
| NO conc. | 200 ppm |
| NH$_3$ conc. | 220 ppm |
| O$_2$ conc. | 20000 ppm |
| H$_2$O conc. | 10% |
| N$_2$ conc. | balance |

4.1.1. Results of Catalytic Measurement of Vanadate Doped TWS Formulations (TiO$_2$/WO$_3$/SiO$_2$: MeVO$_4$)

Table 9 shows the NO removal efficiency of the compositions prepared in the examples 1-15 as well as for the comparative example 1 and 2 after heat treatment of the powder at 650° C./2 hrs.

The catalytic test results showed that all the materials in the examples 1-15 showed a better activity against the comparative example 2.

Some of the materials, particularly the FeVO$_4$ containing composition referred to in example 6 exhibited a significant better catalytic activity when compared to comparative example 1.

TABLE 9

NO$_x$ conversion in % of catalyst compositions (examples 1-15 and comparative example 1 and 2) heat treated 650° C./2 hrs

| Example | Species V-dopant | Preheat-treatment of Vanadate [° C./hrs] | [%] at 200° C. | [%] at 230° C. | [%] at 250° C. | [%] at 270° C. | [%] at 300° C. | [%] at 320° C. | [%] at 350° C. | [%] at 380° C. | [%] at 420° C. | [%] at 450° C. | [%] at 480° C. |
|---|---|---|---|---|---|---|---|---|---|---|---|---|---|
| 1 | $Fe_{0.5}Er_{0.5}VO_4$ | none | 19 | 34 | 57 | 74 | 82 | | | | | | |
| 1a | $Fe_{0.5}Er_{0.5}VO_4$ | 500/20 | 15 | 41 | 60 | 77 | 91 | 95 | 97 | 96 | 95 | 91 | 80 |
| 1b | $Fe_{0.5}Er_{0.5}VO_4$ | 600/20 | 17 | 38 | 56 | 72 | 86 | 90 | 93 | 94 | 92 | 87 | 78 |
| 1d | $Fe_{0.5}Er_{0.5}VO_4$ | 700/20 | 9 | 29 | 48 | 67 | 86 | 91 | 93 | 93 | 88 | 77 | 64 |
| 1e | $Fe_{0.5}Er_{0.5}VO_4$ | 800/20 | 2 | 6 | 11 | 18 | 32 | 42 | 58 | 68 | 73 | 74 | 73 |
| 2 | $Fe_{0.9}Er_{0.1}VO_4$ | none | 30 | 43 | 64 | 75 | 89 | | | | | | |
| 3 | $Fe_{0.8}Er_{0.2}VO_4$ | none | 30 | 35 | 54 | 67 | 98 | | | | | | |
| 4 | $Fe_{0.75}Er_{0.25}VO_4$ | none | 33 | 65 | 75 | 93 | 97 | | | | | | |
| 5 | $Fe_{0.65}Er_{0.35}VO_4$ | none | 21 | 34 | 49 | 65 | 80 | | | | | | |
| 6 | $FeVO_4$ | none | 40 | 74 | 72 | 88 | 93 | | | | | | |
| 6b | $FeVO_4$ | 550/24 | 35 | 66 | 82 | 91 | 96 | 97 | 97 | 97 | 96 | 87 | 73 |
| 6d | $FeVO_4$ | 700/20 | 31 | 62 | 77 | 88 | 95 | 97 | 96 | 96 | 87 | 74 | 58 |
| 7 | $Fe_{0.3}Sm_{0.2}Mn_{0.5}VO_4$ | none | 21 | 46 | 66 | 79 | 87 | | | | | | |
| 8 | $Fe_{0.5}Y_{0.02}Zr_{0.48}VO_4$ | none | 19 | 46 | 62 | 88 | 91 | | | | | | |
| 9 | $Fe_{0.1}Ce_{0.5}Mn_{0.4}VO_4$ | none | 26 | 60 | 73 | 66 | 76 | | | | | | |
| 10 | $Fe_{0.8}Gd_{0.2}VO_4$ | none | 36 | 41 | 58 | 72 | 84 | | | | | | |
| 11 | $Fe_{0.5}Gd_{0.5}VO_4$ | none | 11 | 25 | 55 | 55 | 71 | | | | | | |
| 12 | $Fe_{0.3}Sm_{0.7}VO_4$ | none | 5 | 15 | 28 | 37 | 65 | | | | | | |
| 13 | $Fe_{0.2}Er_{0.8}VO_4$ | none | 0 | 17 | 32 | 49 | 74 | 84 | 92 | 94 | 93 | 90 | 84 |
| 15 | $Fe_{0.5}Er_{0.25}Gd_{0.25}VO_4$ | none | 14 | 37 | 57 | 74 | 90 | 94 | 97 | 97 | 96 | 95 | 87 |
| Comp 1 | $V_2O_5$ | | 34 | 41 | 50 | 72 | 83 | | | | | | |
| Comp 2 | $ErVO_4$ | none | 0 | 0 | 25 | 41 | 69 | | | | | | |
| Comp 2d | $ErVO_4$ | 700/20 | 1 | 4 | 8 | 13 | 22 | 29 | 34 | 38 | 42 | 42 | 42 |

Table 10 shows the NO$_x$ removal efficiency of the compositions prepared in the examples listed as well as for the comparative example 1 and 2 after heat treatment of the powder at 700° C./10 hrs.

All examples with the exception of example 6 show better activity in view of the comparative example 1 and 2.

TABLE 10

NO$x$ conversion in % of catalyst compositions heat treated 700° C./10 hrs

| Example | Species V-dopant | Preheat-treatment of Vanadate [° C./hrs] | [%] at 200° C. | [%] at 230° C. | [%] at 250° C. | [%] at 270° C. | [%] at 300° C. | [%] at 320° C. | [%] at 350° C. | [%] at 380° C. | [%] at 420° C. | [%] at 450° C. | [%] at 480° C. |
|---|---|---|---|---|---|---|---|---|---|---|---|---|---|
| 1 | $Fe_{0.5}Er_{0.5}VO_4$ | none | 8 | 24 | 41 | 57 | 71 | 81 | 88 | 91 | 91 | 90 | 86 |
| 1a | $Fe_{0.5}Er_{0.5}VO_4$ | 500/20 | 25 | 43 | 56 | 69 | 84 | 91 | 97 | 98 | 98 | 97 | 94 |
| 1b | $Fe_{0.5}Er_{0.5}VO_4$ | 600/20 | 22 | 50 | 70 | 85 | 95 | 97 | 98 | 99 | 98 | 93 | 83 |
| 1d | $Fe_{0.5}Er_{0.5}VO_4$ | 700/20 | 23 | 53 | 74 | 89 | 98 | 99 | 99 | 99 | 98 | 91 | 81 |
| 1e | $Fe_{0.5}Er_{0.5}VO_4$ | 800/20 | 15 | 35 | 53 | 71 | 86 | 91 | 95 | 96 | 94 | 88 | 80 |
| 3 | $Fe_{0.8}Er_{0.2}VO_4$ | none | 29 | 62 | 81 | 96 | | | | | | | |
| 4 | $Fe_{0.75}Er_{0.25}VO_4$ | none | 42 | 45 | 50 | 65 | | | | | | | |
| 6 | $FeVO_4$ | none | 2 | 13 | 19 | 28 | 39 | | | | | | |
| 6b | $FeVO_4$ | 550/24 | 21 | 62 | 80 | 92 | 98 | 99 | 99 | 99 | 94 | 81 | 64 |
| 6d | $FeVO_4$ | 700/20 | 54 | 86 | 96 | 98 | 98 | 96 | 97 | 96 | 77 | 60 | 42 |
| 10 | $Fe_{0.8}Gd_{0.2}VO_4$ | none | 9 | 25 | 33 | 44 | 61 | | | | | | |
| 11 | $Fe_{0.5}Gd_{0.5}VO_4$ | none | 10 | 28 | 44 | 62 | 78 | | | | | | |
| 12 | $Fe_{0.3}Sm_{0.7}VO_4$ | none | 14 | 36 | 54 | 74 | 87 | | | | | | |
| 13 | $Fe_{0.2}Er_{0.8}VO_4$ | none | 9 | 26 | 44 | 64 | 86 | 94 | 98 | 98 | 99 | 97 | 95 |
| 15 | $Fe_{0.5}Er_{0.25}Gd_{0.25}VO4$ | none | 39 | 72 | 86 | 93 | 98 | 99 | 99 | 99 | 99 | 95 | 84 |
| Comp 1 | $V_2O_5$ | none | 6 | 22 | 31 | 45 | 58 | | | | | | |
| Comp 2 | $ErVO_4$ | none | 7 | 21 | 56 | 70 | 82 | | | | | | |
| Comp 2d | $ErVO_4$ | 700/20 | 2 | 6 | 12 | 20 | 38 | 50 | 65 | 72 | 73 | 71 | 69 |

Table 11 shows the $NO_x$ removal efficiency of the compositions prepared in the examples 1 and 11 after heat treatment of the powder at 700° C./50 hrs.

TABLE 11

| | | | \multicolumn{11}{c|}{NOx conversion in % of catalyst compositions heat treated 700° C./50 hrs} |
|---|---|---|---|---|---|---|---|---|---|---|---|---|---|
| Example | Species V-dopant | Preheat-treatment of Vanadate [° C./hrs] | [%] at 200° C. | [%] at 230° C. | [%] at 250° C. | [%] at 270° C. | [%] at 300° C. | [%] at 320° C. | [%] at 350° C. | [%] at 380° C. | [%] at 420° C. | [%] at 450° C. | [%] at 480° C. |
| 1 | $Fe_{0.5}Er_{0.5}VO_4$ | none | 18 | 45 | 66 | 84 | 96 | 98 | 98 | 98 | 99 | 92 | 78 |
| 11 | $Fe_{0.5}Gd_{0.5}VO_4$ | none | 33 | 67 | 86 | 95 | 99 | 98 | 98 | 98 | 99 | 94 | 81 |

Table 12 shows the $NO_x$ removal efficiency of the compositions prepared in the examples 1 and 11 after heat treatment of the powder at 700° C./100 hrs.

TABLE 12

| | | | \multicolumn{11}{c|}{NOx conversion in % of catalyst compositions heat treated 700° C./100 hrs} |
|---|---|---|---|---|---|---|---|---|---|---|---|---|---|
| Example | Species V-dopant | Preheat-treatment of Vanadate [° C./hrs] | [%] at 200° C. | [%] at 230° C. | [%] at 250° C. | [%] at 270° C. | [%] at 300° C. | [%] at 320° C. | [%] at 350° C. | [%] at 380° C. | [%] at 420° C. | [%] at 450° C. | [%] at 480° C. |
| 1 | $Fe_{0.5}Er_{0.5}VO_4$ | none | 23 | 52 | 73 | 87 | 96 | 98 | 99 | 98 | 93 | 80 | 68 |
| 11 | $Fe_{0.5}Gd_{0.5}VO_4$ | none | 10 | 32 | 51 | 70 | 86 | 91 | 95 | 96 | 97 | 95 | 89 |

Table 13 shows the $NO_x$ removal efficiency of the compositions prepared in the examples 1, 1a,bd,e, 13 and 15 after heat treatment of the powder at 750° C./10 hrs.

TABLE 13

| | | | \multicolumn{11}{c|}{NOx conversion in % of catalyst compositions heat treated 750° C./10 hrs} |
|---|---|---|---|---|---|---|---|---|---|---|---|---|---|
| Example | Species V-dopant | Preheat-treatment of Vanadate [° C./hrs] | [%] at 200° C. | [%] at 230° C. | [%] at 250° C. | [%] at 270° C. | [%] at 300° C. | [%] at 320° C. | [%] at 350° C. | [%] at 380° C. | [%] at 420° C. | [%] at 450° C. | [%] at 480° C. |
| 1 | $Fe_{0.5}Er_{0.5}VO_4$ | none | 10 | 24 | 40 | 58 | 78 | | | | | | |
| 1a | $Fe_{0.5}Er_{0.5}VO_4$ | 500/20 | 19 | 50 | 67 | 81 | 91 | 95 | 97 | 97 | 95 | 84 | 70 |
| 1b | $Fe_{0.5}Er_{0.5}VO_4$ | 600/20 | 30 | 59 | 76 | 86 | 94 | 96 | 97 | 97 | 91 | 78 | 64 |
| 1d | $Fe_{0.5}Er_{0.5}VO_4$ | 700/20 | 27 | 55 | 74 | 88 | 97 | 98 | 99 | 99 | 99 | 93 | 82 |
| 1e | $Fe_{0.5}Er_{0.5}VO_4$ | 800/20 | 18 | 40 | 58 | 75 | 91 | 95 | 97 | 97 | 95 | 88 | 79 |
| 13 | $Fe_{0.2}Er_{0.8}VO_4$ | none | 12 | 33 | 54 | 75 | 92 | 97 | 99 | 99 | 99 | 99 | 96 |
| 15 | $Fe_{0.5}Er_{0.25}Gd_{0.25}VO_4$ | none | 23 | 58 | 79 | 91 | 97 | 98 | 99 | 99 | 98 | 95 | 85 |
| Comp 1.1 | $V_2O_5$ | none | | | 0 | | | 13 | | | | 10 | |
| Comp 2d | $ErVO_4$ | 700/20 | 2 | 7 | 14 | 25 | 47 | 61 | 75 | 77 | 75 | 73 | 72 |

Table 14 shows the $NO_x$ removal efficiency of the compositions prepared in the examples listed after heat treatment of the powder at 800° C./10 hrs.

In view of the comparative examples 2d and the $FeErVO_4$ containing catalysts as referred to in examples listed exhibit an increased activity

TABLE 14

| | | | \multicolumn{11}{c|}{NOx conversion in % of catalyst compositions heat treated 800° C./10 hrs} |
|---|---|---|---|---|---|---|---|---|---|---|---|---|---|
| Example | Species V-dopant | Preheat-treatment of Vanadate [° C./hrs] | [%] at 200° C. | [%] at 230° C. | [%] at 250° C. | [%] at 270° C. | [%] at 300° C. | [%] at 320° C. | [%] at 350° C. | [%] at 380° C. | [%] at 420° C. | [%] at 450° C. | [%] at 480° C. |
| 1 | $Fe_{0.5}Er_{0.5}VO_4$ | none | 15 | 47 | 72 | 89 | 97 | 98 | 98 | 97 | 86 | 69 | 46 |
| 1a | $Fe_{0.5}Er_{0.5}VO_4$ | 500/20 | 7 | 33 | 52 | 69 | 85 | 89 | 91 | 90 | 80 | 65 | 47 |
| 1b | $Fe_{0.5}Er_{0.5}VO_4$ | 600/20 | 15 | 43 | 64 | 83 | 96 | 98 | 99 | 98 | 88 | 72 | 53 |
| 1d | $Fe_{0.5}Er_{0.5}VO_4$ | 700/20 | 14 | 46 | 67 | 85 | 96 | 97 | 97 | 98 | 94 | 83 | 67 |
| 1e | $Fe_{0.5}Er_{0.5}VO_4$ | 800/20 | 4 | 21 | 35 | 51 | 73 | 83 | 89 | 91 | 91 | 87 | 81 |
| 13 | $Fe_{0.2}Er_{0.8}VO_4$ | none | 16 | 46 | 68 | 85 | 95 | 96 | 96 | 97 | 94 | 85 | 71 |

TABLE 14-continued

NOx conversion in % of catalyst compositions heat treated 800° C./10 hrs

| Example | Species V-dopant | Preheat-treatment of Vanadate [° C./hrs] | [%] at 200° C. | [%] at 230° C. | [%] at 250° C. | [%] at 270° C. | [%] at 300° C. | [%] at 320° C. | [%] at 350° C. | [%] at 380° C. | [%] at 420° C. | [%] at 450° C. | [%] at 480° C. |
|---|---|---|---|---|---|---|---|---|---|---|---|---|---|
| 14d | $Fe_{0.1}Er_{0.9}VO_4$ | 700/20 | 4 | 17 | 34 | 56 | 87 | 96 | 99 | 99 | 97 | 92 | 80 |
| 14f | $Fe_{0.1}Er_{0.9}VO_4$ | 850/20 | 3 | 11 | 22 | 37 | 64 | 75 | 82 | 82 | 80 | 77 | 73 |
| Comp 2d | $ErVO_4$ | 700/20 | 3 | 5 | 14 | 36 | 70 | 84 | 93 | 95 | 95 | 94 | 92 |
| Comp 2f | $ErVO_4$ | 850/20 | 2 | 8 | 17 | 31 | 63 | 79 | 88 | 88 | 83 | 80 | 77 |

4.1.2. Results of Vanadate Doped TW Formulations ($TiO_2$/$WO_3$: $MeVO_4$)

TABLE 15

$NO_x$ conversion in % of catalyst compositions (examples 16 and 17) heat treated 650° C./2 hrs

| Example | Species V-dopant | Preheat-treatment of Vanadate [° C./hrs] | [%] at 200° C. | [%] at 230° C. | [%] at 250° C. | [%] at 270° C. | [%] at 300° C. | [%] at 320° C. | [%] at 350° C. | [%] at 380° C. | [%] at 420° C. | [%] at 450° C. | [%] at 480° C. |
|---|---|---|---|---|---|---|---|---|---|---|---|---|---|
| 16 | $Fe_{0.5}Er_{0.5}VO_4$ | none | 32 | 65 | 81 | 91 | 97 | 98 | 99 | 99 | 97 | 91 | 78 |
| 17 | $Fe_{0.5}Er_{0.25}Gd_{0.25}VO_4$ | none | 15 | 42 | 60 | 76 | 90 | 94 | 97 | 98 | 98 | 96 | 86 |
| Comp 1 | $V_2O_5$*) | none | 34 | 41 | 50 | 72 | 83 | | | | | | |
| Comp 2 | $ErVO_4$*) | none | 0 | 0 | 25 | 41 | 69 | | | | | | |

*)on TWS Support

TABLE 16

$NO_x$ conversion in % of catalyst compositions (examples 16 and 17) heat treated 700° C./10 hrs

| Example | Species V-dopant | Preheat-treatment of Vanadate [° C./hrs] | [%] at 200° C. | [%] at 230° C. | [%] at 250° C. | [%] at 270° C. | [%] at 300° C. | [%] at 320° C. | [%] at 350° C. | [%] at 380° C. | [%] at 420° C. | [%] at 450° C. | [%] at 480° C. |
|---|---|---|---|---|---|---|---|---|---|---|---|---|---|
| 16 | $Fe_{0.5}Er_{0.5}VO_4$ | none | 18 | 48 | 66 | 79 | 89 | 92 | 94 | 94 | 83 | 67 | 44 |
| 17 | $Fe_{0.5}Er_{0.25}Gd_{0.25}VO_4$ | none | 16 | 44 | 66 | 82 | 93 | 95 | 97 | 97 | 91 | 76 | 54 |
| Comp 1 | $V_2O_5$*) | none | 6 | 22 | 31 | 45 | 58 | | | | | | |
| Comp 2 | $ErVO_4$*) | none | 7 | 21 | 56 | 70 | 82 | | | | | | |

*)on TWS Support 4.2. Catalytic Test B (Coated Catalyst)

Test B was performed according to the parameters disclosed in the table 17.

TABLE 17

| Reaction conditions and gas composition | |
|---|---|
| Reactor | 2.54 cm |
| Catalyst | Cordierite honeycomb 400 cpsi, 2.54 cm diameter, h = 5.08 cm, Vol = 25 cm3 (for example 10 and 11); for comp. example 3: h = 2.54 cm, Vol = 12.5 cm3 |
| Space velocity | 30 000 h$^{-1}$ |
| Temperature | 200-550° C./ramp of 5° C./min (only up to 450° C. for comparative example 3) |

TABLE 17-continued

| Reaction conditions and gas composition | |
|---|---|
| NOx conc. | 400 ppm at different conditions |
| | (a) NO, more than 90% |
| | (b) $NO_2$ about 75% |
| | (c) $NO:NO_2$ = 1:0.9-1.1 |
| $NH_3:NOx$ | 1 |
| $O_2$ conc. | 6% |
| $H_2O$ conc. | 7% |
| $N_2$ conc. | balance |

Table 18 shows the $NO_x$ removal efficiency of a honeycomb coated catalyst with the compositions prepared in the examples 18-23 and in comparative example 3 after the catalyst was subjected to different thermal heat treatment conditions. As feedgas there was applied a mixture out of $NO/NO_2$ with about 75% $NO_2$.

TABLE 18

NO$_x$ conversion in % of catalyst compositions heat treated between 650 and 800° C. at temperatures from 200-550° C.; Feedgas = about 75% NO$_2$

| [° C.] | 200 | 225 | 250 | 275 | 300 | 325 | 350 | 375 | 400 | 425 | 450 | 475 | 500 | 525 | 550 |
|---|---|---|---|---|---|---|---|---|---|---|---|---|---|---|---|
| Example 18 | | | | | | | | | | | | | | | |
| 650° C./2 hrs[1] | 15 | 47 | 33 | 31 | 32 | 33 | 35 | 40 | 47 | 54 | 66 | 70 | 69 | 62 | 50 |
| 750° C./8 hrs*) | 40 | 38 | 37 | 40 | 48 | 52 | 58 | 60 | 65 | 70 | 77 | 76 | 70 | 68 | 58 |
| Example 19 | | | | | | | | | | | | | | | |
| 650° C./2 hrs[1] | 42 | 31 | 28 | 30 | 31 | 37 | 40 | 45 | 50 | 61 | 70 | 72 | 71 | 70 | 60 |
| 750° C./8 hrs*) | 20 | 40 | 48 | 53 | 57 | 59 | 60 | 62 | 68 | 73 | 77 | 77 | 73 | 70 | 68 |
| 750° C./8 + 20 hrs*) | 18 | 35 | 40 | 52 | 55 | 56 | 57 | 58 | 61 | 65 | 68 | 70 | 68 | 65 | 55 |
| 750° C./8 + 20 hrs*) + 800° C./20 hrs*) | 18 | 25 | 30 | 42 | 46 | 48 | 50 | 52 | 55 | 60 | 65 | 68 | 68 | 62 | 55 |
| Example 20 | | | | | | | | | | | | | | | |
| 650° C./2 hrs[1] | 20 | 40 | 28 | 29 | 30 | 32 | 35 | 38 | 45 | 55 | 65 | 70 | 65 | 58 | 48 |
| 750° C./8 hrs*) | 10 | 40 | 35 | 48 | 52 | 58 | 60 | 61 | 63 | 70 | 74 | 75 | 71 | 63 | 55 |
| Example 21 | | | | | | | | | | | | | | | |
| 650° C./2 hrs[1] | 30 | 38 | 31 | 34 | 38 | 42 | 49 | 55 | 62 | 70 | 78 | 79 | 73 | 68 | 60 |
| 750° C./8 hrs*) | 15 | 35 | 43 | 50 | 52 | 54 | 57 | 59 | 63 | 68 | 71 | 72 | 68 | 60 | 40 |
| Example 22 | | | | | | | | | | | | | | | |
| 700° C./20 hrs[2] | 25 | 40 | 43 | 50 | 52 | 55 | 59 | 61 | 64 | 69 | 73 | 78 | 77 | 71 | 65 |
| 750° C./8 hrs*) | 38 | 40 | 47 | 50 | 53 | 55 | 59 | 61 | 64 | 69 | 73 | 74 | 73 | 69 | 60 |
| 750° C./8 + 20 hrs*) | 39 | 34 | 40 | 45 | 49 | 52 | 55 | 59 | 62 | 67 | 72 | 73 | 72 | 68 | 59 |
| Example 23 | | | | | | | | | | | | | | | |
| 700° C./50 hrs[2] | 25 | 39 | 41 | 48 | 52 | 55 | 58 | 60 | 62 | 68 | 72 | 75 | 73 | 70 | 62 |
| 750° C./8 hrs*) | 12 | 40 | 43 | 49 | 52 | 54 | 58 | 60 | 62 | 68 | 72 | 74 | 73 | 70 | 61 |
| 750° C./8 + 20 hrs*) | 22 | 36 | 40 | 48 | 51 | 54 | 58 | 60 | 62 | 66 | 71 | 73 | 72 | 69 | 60 |
| Comp Ex 3 | | | | | | | | | | | | | | | |
| 700° C./8 hrs[1] | 40 | 31 | 28 | 29 | 29 | 31 | 46 | 58 | 60 | 63 | 63 | | | | |
| 700° C./4 hrs**) | 40 | 35 | 36 | 38 | 39 | 40 | 43 | 58 | 62 | 68 | 70 | | | | |
| 750° C./4 hrs**) | 40 | 35 | 35 | 38 | 39 | 40 | 45 | 56 | 60 | 60 | 60 | | | | |

[1])Preheattreatment of powder prior to coating
[2])Heattreatment of catalyst after coating
*)ageing of coated catalyst in presence of 10% water
**)ageing of coated catalyst without presence of water Table 19 shows the NO$_x$ removal efficiency of a honeycomb coated catalyst with the compositions prepared in the examples 18-23 and in comparative example 3 after the catalyst was subjected to different thermal heat treatment conditions. As feedgas there was applied a mixture out of NO/NO$_2$ with more than 90% NO.

TABLE 19

NO$_x$ conversion in % of catalyst compositions heat treated between 650 and 800° C. at temperatures from 200-550° C.; Feedgas = more than 90% NO

| [° C.] | 200 | 225 | 250 | 275 | 300 | 325 | 350 | 375 | 400 | 425 | 450 | 475 | 500 | 525 | 550 |
|---|---|---|---|---|---|---|---|---|---|---|---|---|---|---|---|
| Example 18 | | | | | | | | | | | | | | | |
| 650° C./2 hrs [1] | 4 | 4 | 4 | 5 | 5 | 7 | 10 | 20 | 30 | 40 | 50 | 59 | 60 | 59 | 56 |
| 750° C./8 hrs *) | 8 | 8 | 10 | 14 | 20 | 35 | 48 | 62 | 72 | 80 | 83 | 83 | 80 | 78 | 70 |
| Example 19 | | | | | | | | | | | | | | | |
| 650° C./2 hrs [1] | 8 | 8 | 8 | 8 | 10 | 12 | 20 | 25 | 35 | 45 | 50 | 58 | 65 | 64 | 60 |
| 750° C./8 hrs *) | 8 | 10 | 16 | 25 | 38 | 48 | 62 | 75 | 80 | 85 | 85 | 83 | 81 | 75 | 70 |
| 750° C./8 + 20 hrs *) | 8 | 6 | 10 | 19 | 29 | 40 | 50 | 60 | 68 | 73 | 77 | 76 | 73 | 70 | 64 |
| 750° C./8 + 20 hrs *) + 800° C./20 hrs *) | 10 | 5 | 8 | 10 | 14 | 18 | 25 | 33 | 37 | 42 | 48 | 48 | 47 | 45 | 40 |

TABLE 19-continued

NO$_x$ conversion in % of catalyst compositions heat treated between 650 and 800° C. at temperatures from 200-550° C.; Feedgas = more than 90% NO

| [° C.] | 200 | 225 | 250 | 275 | 300 | 325 | 350 | 375 | 400 | 425 | 450 | 475 | 500 | 525 | 550 |
|---|---|---|---|---|---|---|---|---|---|---|---|---|---|---|---|
| Example 20 | | | | | | | | | | | | | | | |
| 650° C./2 hrs [1] | 3 | 3 | 4 | 4 | 5 | 8 | 10 | 17 | 21 | 30 | 40 | 50 | 52 | 51 | 48 |
| 750° C./8 hrs *) | 8 | 8 | 11 | 18 | 28 | 38 | 51 | 68 | 77 | 82 | 85 | 85 | 82 | 78 | 66 |
| Example 23 | | | | | | | | | | | | | | | |
| 650° C./2 hrs [1] | 5 | 5 | 7 | 10 | 15 | 21 | 30 | 40 | 51 | 63 | 70 | 75 | 77 | 75 | 70 |
| 750° C./8 hrs *) | 9 | 8 | 9 | 12 | 19 | 25 | 35 | 45 | 49 | 52 | 55 | 54 | 52 | 45 | 30 |
| Example 22 | | | | | | | | | | | | | | | |
| 700° C./20 hrs [2] | 9 | 9 | 14 | 21 | 30 | 38 | 50 | 62 | 69 | 74 | 78 | 79 | 78 | 75 | 70 |
| 750° C./8 hrs *) | 9 | 8 | 11 | 18 | 26 | 35 | 45 | 55 | 61 | 68 | 70 | 71 | 70 | 68 | 60 |
| 750° C./8 + 20 hrs *) | 11 | 9 | 12 | 18 | 25 | 33 | 40 | 49 | 55 | 59 | 62 | 62 | 60 | 58 | 50 |
| Example 25 | | | | | | | | | | | | | | | |
| 700° C./50 hrs [2] | 10 | 10 | 13 | 20 | 29 | 38 | 50 | 60 | 68 | 75 | 78 | 79 | 78 | 75 | 70 |
| 750° C./8 hrs *) | 11 | 10 | 15 | 21 | 30 | 40 | 50 | 60 | 67 | 70 | 72 | 72 | 71 | 68 | 62 |
| 750° C./8 + 20 hrs *) | 10 | 9 | 12 | 18 | 27 | 33 | 43 | 50 | 58 | 62 | 63 | 63 | 62 | 60 | 62 |
| Comp Ex 3 | | | | | | | | | | | | | | | |
| 700° C./8 hrs [1] | 7 | 7 | 7 | 15 | 18 | 18 | 18 | 18 | 18 | | | | | | |

[1] Preheattreatment of powder prior to coating
[2] Heattreatment of catalyst after coating
*) ageing of coated catalyst in presence of 10% water Table 20 shows the NO$_x$ removal efficiency of a honeycomb coated catalyst with the compositions prepared in the examples 20-25 after the catalyst was subjected to different thermal heat treatment conditions. As feedgas there was applied a mixture out of NO/NO$_2$ in a ratio 50/50.

TABLE 20

NO$_x$ conversion in % of catalyst composition heat treated between 650° C. and 800° C. at temperatures from 200-550° C.; Feedgas = NO/NO$_2$ (50/50)

| [° C.] | 200 | 225 | 250 | 275 | 300 | 325 | 350 | 375 | 400 | 425 | 450 | 475 | 500 | 525 | 550 |
|---|---|---|---|---|---|---|---|---|---|---|---|---|---|---|---|
| Example 18 | | | | | | | | | | | | | | | |
| 650° C./2 hrs [1] | 10 | 40 | 32 | 29 | 30 | 32 | 40 | 50 | 62 | 77 | 80 | 78 | 72 | 63 | 52 |
| 750° C./8 hrs *) | 13 | 38 | 40 | 51 | 68 | 80 | 88 | 93 | 93 | 92 | 88 | 82 | 76 | 68 | 60 |
| Example 19 | | | | | | | | | | | | | | | |
| 650° C./2 hr [1] | 15 | 35 | 30 | 30 | 35 | 45 | 55 | 70 | 80 | 88 | 86 | 82 | 78 | 68 | 60 |
| 750° C./8 hrs *) | 15 | 58 | 68 | 80 | 84 | 88 | 90 | 93 | 92 | 90 | 88 | 83 | 78 | 70 | 60 |
| 750° C./8 + 20 hrs *) | 18 | 50 | 68 | 82 | 88 | 90 | 93 | 95 | 94 | 91 | 88 | 85 | 80 | 70 | 60 |
| 750° C./8 + 20 hrs *) + 800° C./20 hrs *) | 20 | 28 | 40 | 55 | 70 | 82 | 88 | 90 | 90 | 88 | 83 | 78 | 72 | 66 | 60 |
| Example 21 | | | | | | | | | | | | | | | |
| 650° C./2 hrs [1] | 21 | 31 | 30 | 35 | 42 | 55 | 70 | 80 | 88 | 90 | 88 | 82 | 78 | 71 | 63 |
| 750° C./8 hrs *) | 35 | 45 | 60 | 74 | 81 | 88 | 90 | 92 | 90 | 87 | 80 | 74 | 63 | 55 | 37 |
| Example 22 | | | | | | | | | | | | | | | |
| 700° C./20 hrs [2] | 20 | 48 | 58 | 70 | 78 | 83 | 88 | 90 | 92 | 92 | 90 | 86 | 81 | 75 | 65 |
| 750° C./8 hrs *) | 20 | 45 | 55 | 65 | 75 | 82 | 87 | 90 | 92 | 92 | 90 | 85 | 80 | 73 | 62 |
| 750° C./8 + 20 hrs *) | 25 | 43 | 56 | 65 | 77 | 83 | 88 | 90 | 92 | 92 | 89 | 83 | 78 | 69 | 60 |
| Example 23 | | | | | | | | | | | | | | | |
| 700° C./50 hrs [2] | 20 | 49 | 58 | 68 | 79 | 84 | 88 | 90 | 92 | 92 | 90 | 86 | 80 | 75 | 66 |
| 750° C./8 hrs *) | 20 | 45 | 54 | 68 | 78 | 83 | 88 | 90 | 92 | 92 | 90 | 85 | 80 | 73 | 67 |
| 750° C./8 + 20 hrs *) | 31 | 45 | 58 | 69 | 78 | 82 | 88 | 90 | 92 | 92 | 89 | 84 | 78 | 70 | 60 |
| Comp Ex 3 | | | | | | | | | | | | | | | |
| 700° C./8 hrs [1] | 29 | 27 | 28 | 30 | 40 | 50 | 57 | 59 | 60 | 62 | 62 | | | | |

[1] Preheattreatment of powder prior to coating
[2] Heattreatment of catalyst after coating
*) ageing of coated catalyst in presence of 10% water

The invention claimed is:

1. A catalyst composition comprising:

$XVO_4/S$ wherein $XVO_4$ stands for:
- (a) a an Fe-Vanadate, optionally in mixture with other Transition Metal Vanadates, or
- (b) a mixed Fe-/Rare Earth-Vanadate, optionally in mixture with one or more other Transition Metal Vanadates; and S is a support comprising $TiO_2$.

2. The catalyst composition according to claim 1, wherein the other Transition Metal is selected from the group consisting of Mn, Cu, Zn, Zr, Nb, Mo, Ta, W, and combinations thereof.

3. The catalyst composition according to claim 2, wherein the other Transition Metal is selected from the group consisting of Mn, Cu, Zr, and combinations thereof.

4. The catalyst composition according to claim 1, wherein $XVO_4$ stands for
- (a) an Fe-Vanadate, or
- (b) a mixed Fe-/Rare Earth-Vanadate.

5. The catalyst composition according to claim 1, wherein said support contains $TiO_2$ in an amount of at least 55 wt.-%, $WO_3$ in an amount of 1-20 wt.-%, and optionally $SiO_2$ in an amount of up to 20 wt.-%, said catalyst composition containing $XVO_4$ in an amount between 0.2% by weight and 25% by weight.

6. The catalyst composition according to claim 1, wherein the Rare Earth is Er.

7. The catalyst composition according to claim 1, wherein the Rare Earth is selected from the group consisting of Sm, Gd and Y.

8. The catalyst composition according to claim 1, wherein S contains $SiO_2$ in an amount of 4-15 wt.-%.

9. The catalyst composition according to claim 1, wherein the vanadate is selected from the group consisting of $Fe_{0.5}Er_{0.5}VO_4$, $Fe_{0.8}Er_{0.2}VO_4$, $Fe_{0.75}Er_{0.25}VO_4$, $Fe_{0.65}Er_{0.35}VO_4$, $Fe_{0.8}Gd_{0.2}VO_4$, $Fe_{0.5}Gd_{0.5}VO_4$, $Fe_{0.3}Sm_{0.7}VO_4$, $Fe_{0.2}Er_{0.8}VO_4$, $Fe_{0.5}Er_{0.25}Gd_{0.25}VO_4$ and combinations thereof.

10. The catalyst composition according to claim 9, wherein the support S contains $TiO_2$ in an amount of at least 55 wt.-%, $WO_3$ in an amount of 1-20 wt.-%, and optionally $SiO_2$ in an amount of up to 20 wt.-%, said catalyst composition containing $XVO_4$ in an amount between 0.2% by weight and 25% by weight.

11. A process for the preparation of a catalyst composition according to claim 1, comprising:
- a) suspending a support material containing $TiO_2$ and $XVO_4$ in water forming an intimate mixture comprising said support material and said $XVO_4$,
- b) evaporating excess water,
- c) drying the mixture, and
- d) calcining the dried mixture under air at a temperature between 500 and 850° C.

12. The process according to claim 11, wherein the other Transition Metal is selected from the group consisting of Mn, Cu, Zn, Zr, Nb, Mo, Ta, W, and combinations thereof.

13. The process according to claim 11, wherein the other Transition Metal is selected from the group consisting of Mn, Cu, Zr, and combinations thereof.

14. The process according to claim 11, wherein said $XVO_4$ is pre-heat treated at a temperature in the range of higher than 350° C. and below its melting point prior to forming the intimate mixture comprising said support material and said $XVO_4$.

15. A method of exhaust gas after treatment, the method comprising:

providing the composition according to claim 1; and treating an exhaust gas with the composition.

16. A catalyst comprising:

a catalyst composition according to claim 1; and a binder.

17. The catalyst composition according to claim 16, wherein $XVO_4$ stands for a mixed Fe-/Er-Vanadate, Fe-Vanadate, optionally in mixture with other Transition Metal Vanadates.

18. The catalyst composition according to claim 17, wherein S is a support comprising $TiO_2$ in an amount of at least 55 wt.-%, $WO_3$ in an amount of 1-20 wt.-%, and optionally $SiO_2$ in an amount of up to 20 wt.-%, said catalyst composition containing $XVO_4$ in an amount between 0.2% by weight and 25% by weight.

* * * * *